United States Patent [19]

Suekane

[11] Patent Number: 5,208,625
[45] Date of Patent: May 4, 1993

[54] AUTOMATIC FOCUSING APPARATUS

[75] Inventor: Hisashi Suekane, Tokyo, Japan

[73] Assignee: Olympus Optical Co., Ltd., Tokyo, Japan

[21] Appl. No.: 861,304

[22] Filed: Mar. 31, 1992

[30] Foreign Application Priority Data

Apr. 2, 1991 [JP] Japan .................. 3-94870

[51] Int. Cl.$^5$ ........................... G03B 3/00; G03B 7/00
[52] U.S. Cl. .................................. 354/402; 354/407; 354/412
[58] Field of Search ............... 354/402, 403, 406, 407, 354/410, 412

[56] References Cited

U.S. PATENT DOCUMENTS

| | | | |
|---|---|---|---|
| 4,492,448 | 1/1985 | Ishikawa et al. | 354/406 |
| 4,816,856 | 3/1989 | Hamada et al. | 354/402 |
| 4,860,045 | 8/1989 | Hamada et al. | 354/402 |
| 5,005,039 | 4/1991 | Hamada et al. | 354/402 |

FOREIGN PATENT DOCUMENTS 60-166910 8/1985 Japan .
60-214325 10/1985 Japan .

Primary Examiner—Michael L. Gellner
Assistant Examiner—Jae N. Noh
Attorney, Agent, or Firm—Frishauf, Holtz, Goodman & Woodward

[57] ABSTRACT

An automatic focusing apparatus detects movement of an object image by a phase difference method so as to perform a predicted AF operation and a focusing operation by detecting an object image moving in a lateral direction perpendicular to the optical axis, thereby reliably focusing on a specific object. In the automatic focusing apparatus, light from an object is split into two light beams by first and second photoelectric transducer arrays, and the two light beams are converted into first and second object image signals. An object image moving amount calculation section calculates the moving amounts of first and second object images on the basis of first and second object image positions on the first and second photoelectric transducer arrays, and the first and second object image positions after an elapse of a first predetermined period of time. Based on the calculation outputs, an object image position prediction calculation section calculates first and second object image positions after an elapse of a second predetermined period of time following the first predetermined period of time. Based on the predicted first and second object image positions, a lens driving amount calculation section calculates a necessary lens driving amount, thus predicting movement of an object.

20 Claims, 16 Drawing Sheets

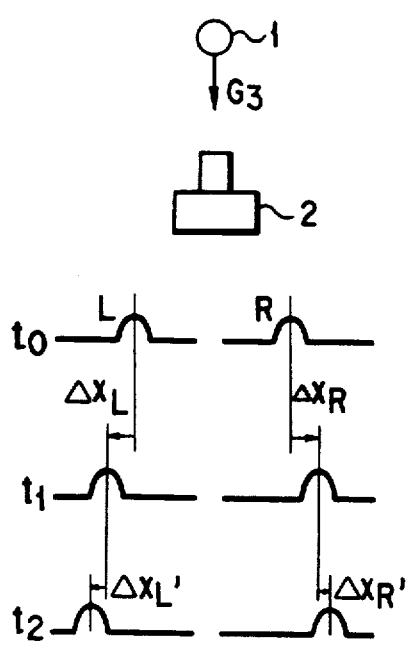
F I G. 3A
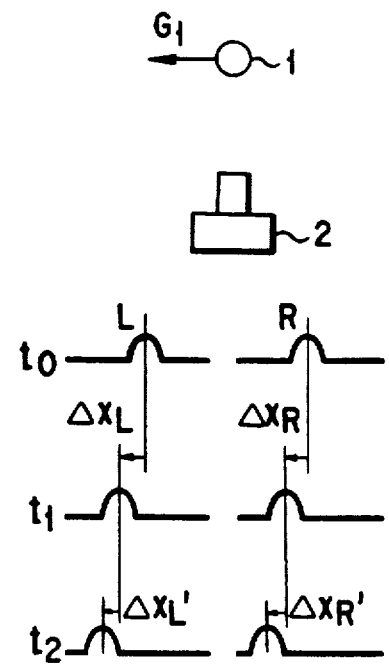
F I G. 3B
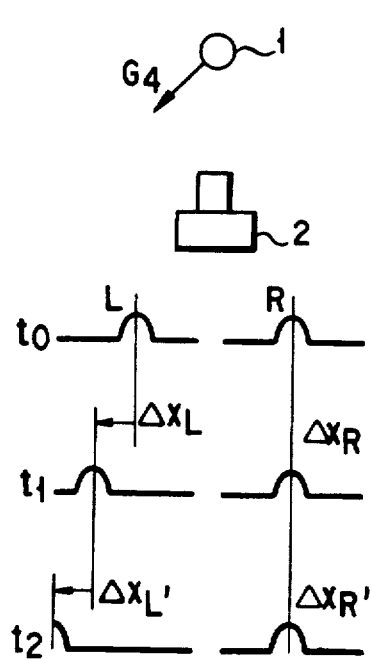
F I G. 3C
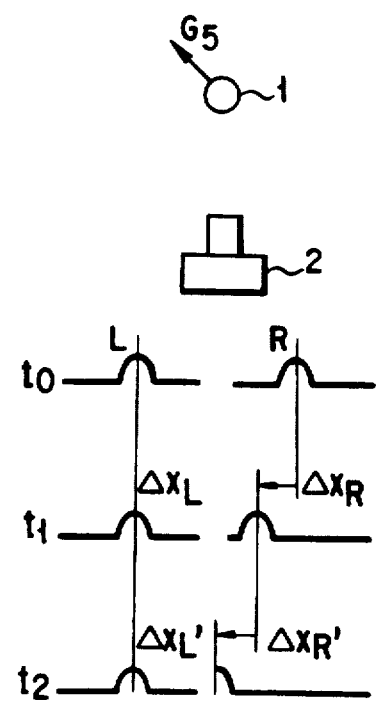
F I G. 3D

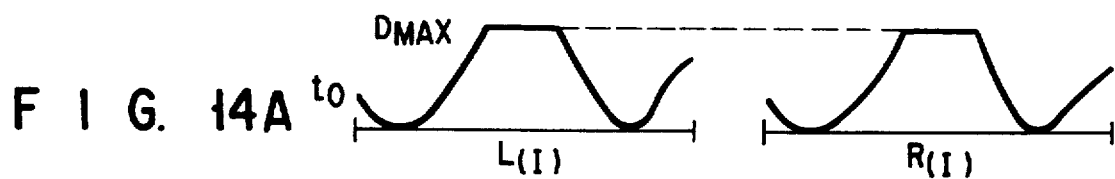
F I G. 14A $t_0$
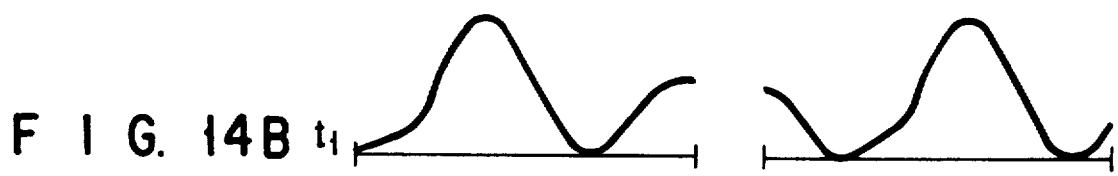
F I G. 14B $t_1$
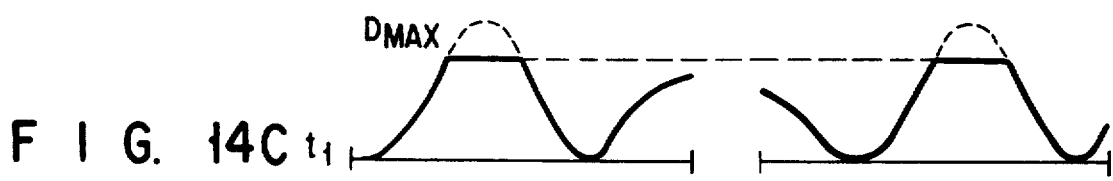
F I G. 14C $t_1$
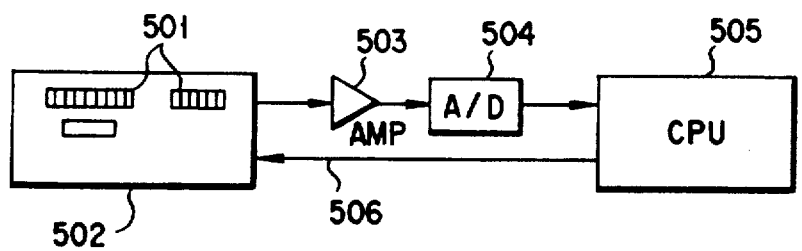
F I G. 15

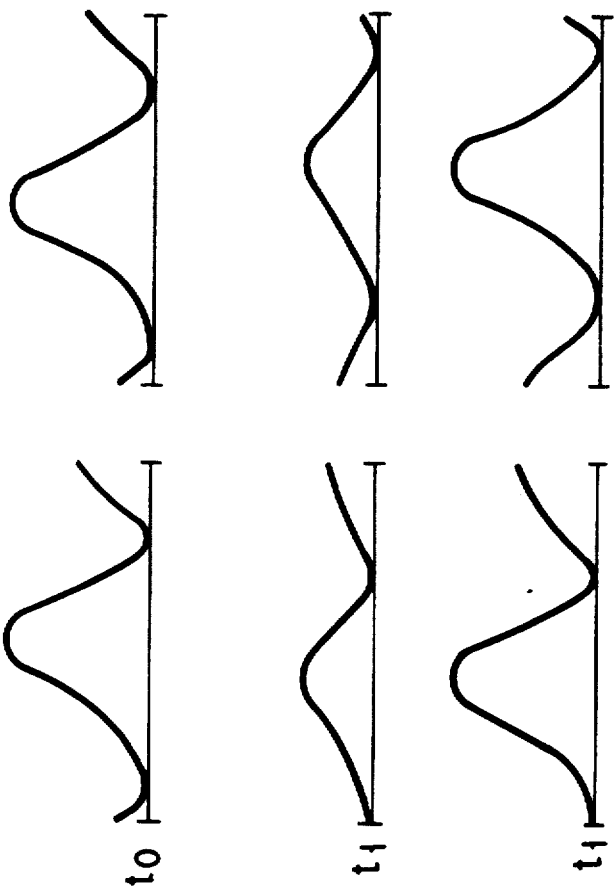

AUTOMATIC FOCUSING APPARATUS

BACKGROUND OF THE INVENTION

1. Field of the Invention

The present invention relates to an automatic focusing apparatus used in, e.g., a camera and, more particularly, to an automatic focusing apparatus for performing a predicted AF (auto-focus) operation and a focusing operation of an object, which is moving in a direction perpendicular to an optical axis.

2. Description of the Related Art

Conventionally, a large number of apparatuses for detecting and processing movement of an object in an automatic focusing apparatus for a camera have been proposed. For example, in Published Unexamined Japanese Patent Application No. 60-166910, a difference between object image signals before and after an elapse of a predetermined period of time is calculated to detect movement of an object image, and a camera-shake alarm is generated to predict that a focusing operation cannot be performed. In, e.g., Published Unexamined Japanese Patent Application No. 60-214325 discloses a means for detecting movement of an object in the optical axis direction on the basis of a change in defocus amount to predict the position of the object after an elapse of a predetermined period of time, and correcting the lens driving amount.

In an apparatus disclosed in Published Unexamined Japanese Patent Application No. 60-166910, when the movement of an object is detected, a photographer determines that a focused photograph cannot be obtained, and he or she misses a photographing chance. Even when the photographer performs a photographing operation, a focused photograph cannot be obtained.

In an apparatus disclosed in Published Unexamined Japanese Patent Application No. 60-214325, since movement of an object in the optical axis direction is detected, and a lens follows the detected movement, an object that is moving straight along the optical axis direction can be focused. However, in the following case, a focusing operation cannot be performed.

More specifically, in this apparatus, since only a change in defocus amount is detected, when an object 1 is moving in a lateral direction (in a direction of an arrow $G_1$ in FIG. 1A) perpendicular to the optical axis of a camera 2, as shown in FIG. 1A, an object image falls outside a distance-measurement frame for detecting a defocus amount. For this reason, a wrong moving speed is detected. When objects 1 and 1' are present side by side at two close distances, as shown in FIG. 1B, if a photographer slightly changes an angle of the camera (in a direction of an arrow $G_2$ in FIG. 1B), an object to be subjected to distance measurement is changed. For this reason, the defocus amount changes inadvertently.

Due to a change in defocus amount, the camera determines that the object is moving, and corrects the lens driving amount. For this reason, a focused photograph cannot be obtained. More specifically, the camera merely detects only a change in defocus amount, but does not detect whether or not an object to be subjected to distance measurement is a single object.

SUMMARY OF THE INVENTION

It is an object of the present invention to provide an automatic focusing apparatus, which detects movement of an object image including not only movement in an optical axis direction but also movement in a lateral direction perpendicular to the optical axis direction so as to always detect a single object, so that a moving object can be reliably focused.

According to an aspect of the present invention, there is provided a focus detection apparatus comprising: a focus detection optical system for splitting light from an object into two light beams; two photoelectric transducer groups for converting the light beams guided by the focus detection optical system into first and second object image signals; shift amount calculation means for calculating a focus shift amount on the basis of the first and second object image signals; storage means for storing the first and second image signals and the focus shift amount at a first timing; first prediction calculation means for predictively calculating the first object image signal at a third timing on the basis of the first object image signal at a second timing, and the first object image signal at the first timing stored in the storage means; second prediction calculation means for predictively calculating the second object image signal at the third timing on the basis of the second object image signal at the second timing, and the second object image signal at the first timing stored in the storage means; and shift amount prediction calculation means for predictively calculating a focus shift amount at the third timing on the basis of the focus shift amount at the first timing stored in the storage means, the first object image signal at the third timing calculated by the first prediction calculation means, and the second object image signal at the third timing calculated by the second prediction calculation means.

According to another aspect of the present invention, there is provided a focus detection apparatus comprising: a focus detection optical system for splitting light from an object into two light beams; two photoelectric transducer groups for converting the light beams guided by the focus detection optical system into first and second object image signals; first calculation means for performing a correlation calculation of the first and second object image signals to calculate a focus shift amount; storage means for storing the first and second object image signals and the focus shift amount at a first timing; second calculation means for performing a correlation calculation of the first object image signal at a second timing, and the first object image signal at the first timing stored in the storage means so as to calculate a moving amount or a moving speed of the first object image signal, which is moving along the photoelectric transducer group upon movement of the object; third calculation means for performing a correlation calculation of the second object image signal at the second timing, and the second object image signal at the first timing stored in the storage means so as to calculate a moving amount or a moving speed of the second object image signal, which is moving along the photoelectric transducer group upon movement of the object; and shift amount prediction calculation means for predictively calculating a focus shift amount at a predetermined timing on the basis of the focus shift amount stored in the storage means, and the outputs from the second and third calculation means, wherein each of the first, second, and third calculation means comprises judgment means for judging a presence/absence of a correlation in the correlation calculation, and judgment levels of the presence/absence of the correlation of the second and third calculation means are smaller than a judgment level of the first calculation means.

According to still another aspect of the present invention, there is provided a focus detection method for splitting light from an object into two light beams, guiding the light beams to first and second photoelectric transducer groups, and detecting a focal point on the basis of a phase difference between first and second object image signals from the first and second photoelectric transducer groups, comprising the steps of: a) repetitively storing the first and second object image signals from the first and second photoelectric transducer groups; b) repetitively calculating a moving amount of the first object image signal, which is moving along the photoelectric transducer group upon movement of an object, on the basis of the current first object image signal output from the first photoelectric transducer group, and the previous first object image signal stored in the storage means; c) repetitively calculating a moving amount of the second object image signal, which is moving along the photoelectric transducer group upon movement of an object, on the basis of the current second object image signal output from the second photoelectric transducer group, and the previous second object image signal stored in the storage means; d) updating storage values of the first and second object image signals; e) predicting a position of the first object image signal on the first photoelectric transducer group after an elapse of a predetermined period of time on the basis of the moving amount calculated in the step b); f) predicting a position of the second object image signal on the second photoelectric transducer group after the elapse of the predetermined period of time on the basis of the moving amount calculated in the step c); g) predicting a focus shift amount after the elapse of the predetermined period of time on the basis of the predicted positions calculated in the steps e) and f); and h) repeating from the step b) to step g).

According to further another aspect of the present invention, there is provided an automatic focusing apparatus having image split means for splitting an object image into two images, and first and second photoelectric transducer arrays for respectively receiving the split images, comprising: moving amount calculation means for calculating a moving amount of a first object image on the basis of a position of the first object image on the first photoelectric transducer array at a first timing, and a position of the first object image after an elapse of a first predetermined period of time from the first timing, and for calculating a moving amount of a second object image on the basis of a position of the second object image on the second photoelectric transducer array at the first timing, and a position of the second object image after the elapse of the first predetermined period of time from the first timing; prediction calculation means for predicting the positions of the first and second object images after an elapse of a second predetermined period of time following the first predetermined period of time, on the basis of outputs from the moving amount calculation means; and means for calculating a necessary lens driving amount on the basis of the predicted positions of the first and second object images predicted by the prediction calculation means.

According to another aspect of the present invention, there is provided a distance detection apparatus for a camera, which has image split means for splitting an object image into first and second images, and first and second photoelectric transducer arrays for respectively receiving the split images, comprising: means for calculating an image shift amount of an object on the basis of the first and second images in an early stage of a focus detection operation; first calculation means for calculating a change in position over time of the first image on the first photoelectric transducer array; second calculation means for calculating a change in position over time of the second image on the second photoelectric transducer array; and means for calculating a position of the object image on the basis of the image shift amount, and outputs from the first and second calculation means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A through 3D are views showing the relationship among an object, a camera, and a sensor to explain the principle of focus detection;

FIG. 4 is a view showing the relationship among an object, a photographing lens, an object image, and the like;

FIGS. 14A, 14B, and 14C are charts showing object image signal waveforms in a photoelectric transducer;

FIG. 15 is a block diagram showing another photoelectric transducer device in the embodiment of the present invention; and FIGS. 16A, 16B, and 16C are charts showing object image signal waveforms in the photoelectric transducer device shown in FIG. 15.

DETAILED DESCRIPTION OF THE PREFERRED EMBODIMENTS

The preferred embodiments of the present invention will be described hereinafter with reference to the accompanying drawings.

Figure 1:
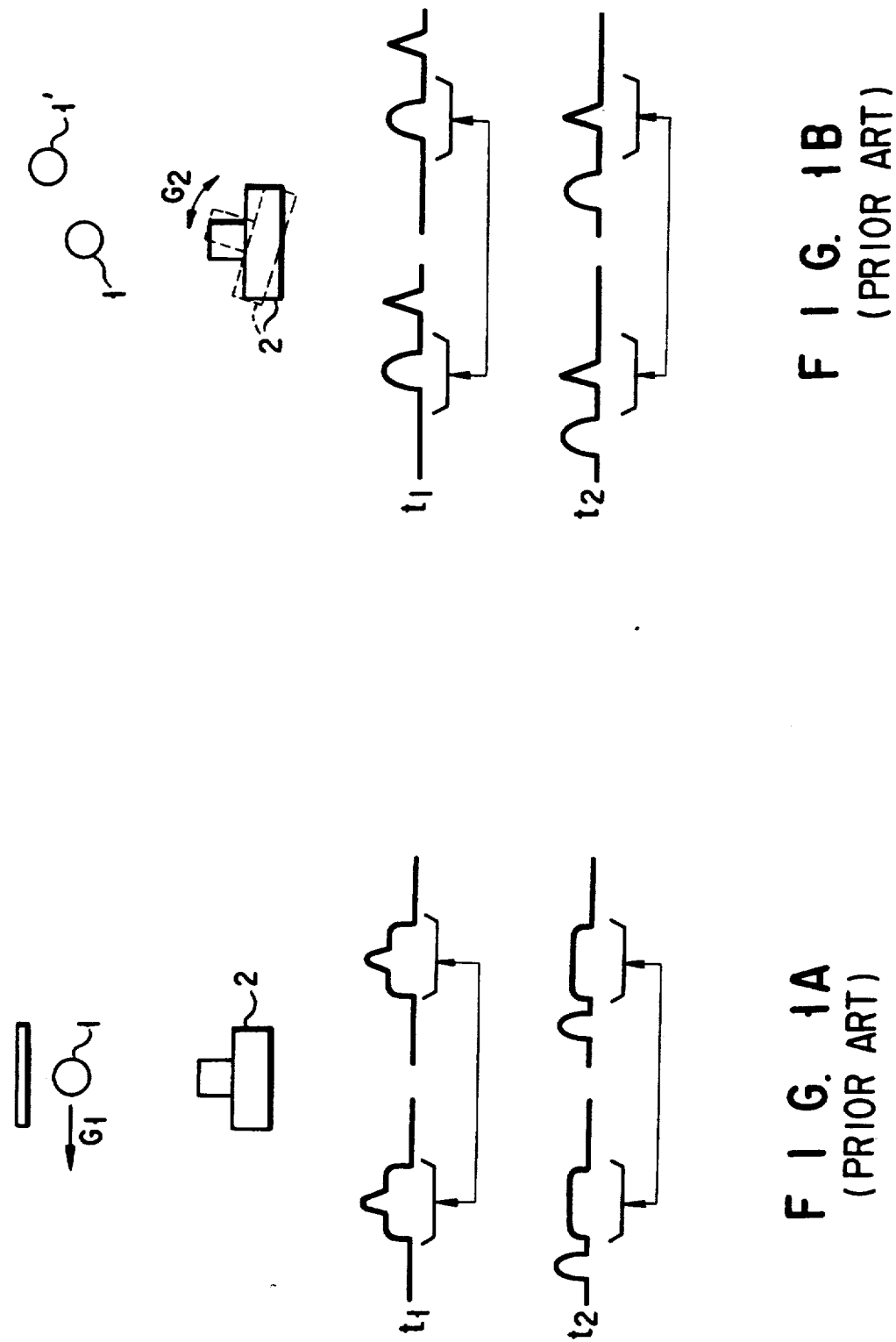
FIGS. 1A and 1B are views showing the relationship among an object, a camera, and a sensor to explain focus detection methods of the prior arts.
Figure 2:
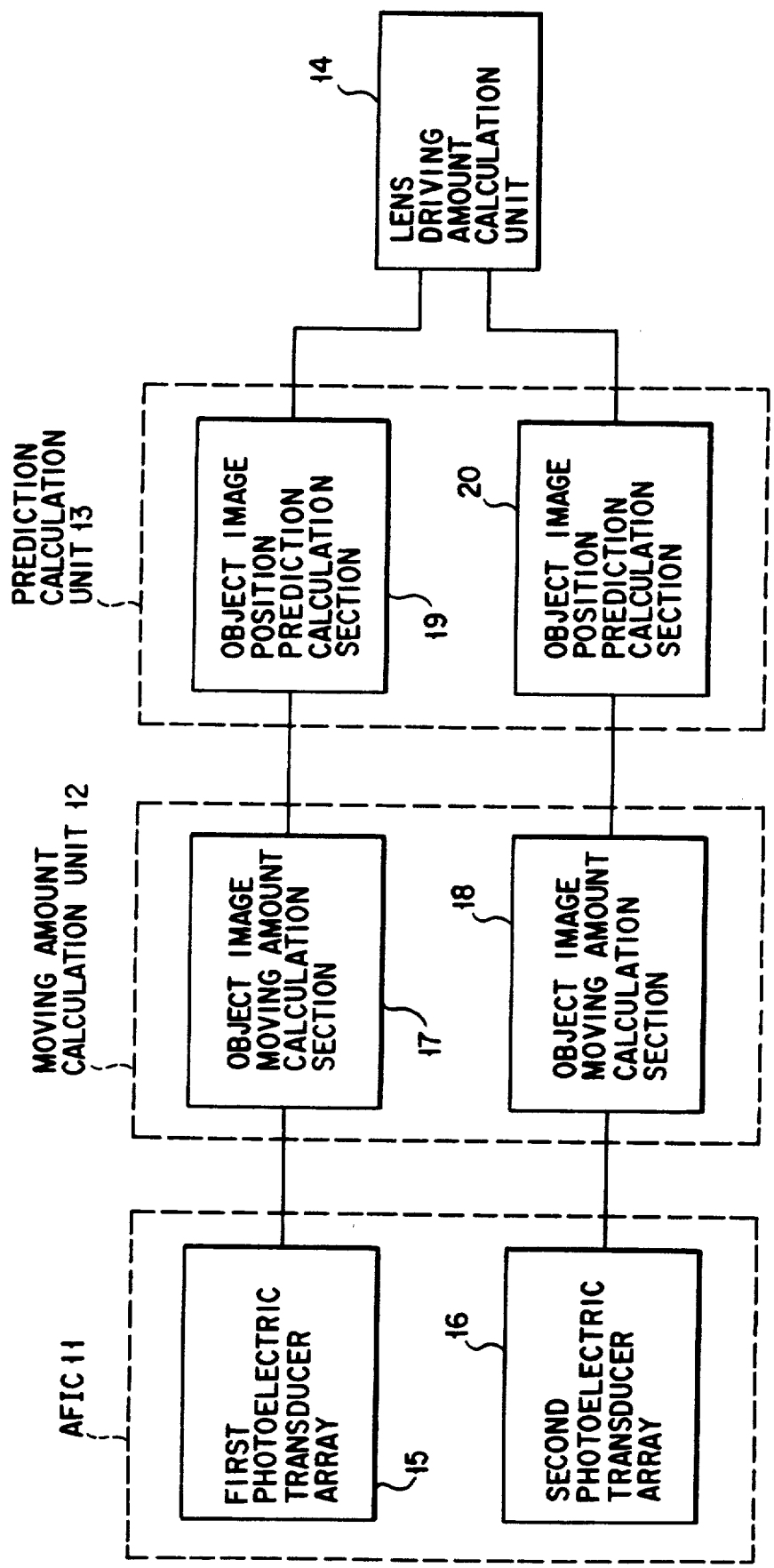
FIG. 2 is a block diagram showing the basic arrangement of an automatic focusing apparatus according to the present invention.

FIG. 2 is a block diagram showing the basic arrangement of an automatic focusing apparatus according to the present invention. The automatic focusing apparatus comprises an AFIC 11, a moving amount calculation unit 12, a prediction calculation unit 13, and a lens driving amount calculation unit 14 for calculating a necessary lens driving amount on the basis of the output from the prediction calculation unit 13.

The AFIC 11 has first and second photoelectric transducer arrays 15 and 16 for respectively receiving two-split images of an object optical image. The moving amount calculation unit 12 has an object image moving amount calculation section 17 for calculating the moving amount of a first object image on the basis of a second object image position on the first photoelectric transducer array 15 at a first timing, and a second object image position after an elapse of a first predetermined period of time from the first timing, and an object image moving amount calculation section 18 for calculating the moving amount of a second object image on the basis of a second object image position on the second photoelectric transducer array 16 at the first timing and the first object image position after an elapse of the first predetermined period of time.

Furthermore, the prediction calculation unit 13 has object image position prediction calculation sections 19 and 20 for predicting the first and second object image positions after an elapse of a second predetermined period of time following the first predetermined period of time on the basis of the output from the moving amount calculation unit 12. The lens driving amount calculation unit 14 calculates a necessary lens driving amount on the basis of the predicted first and second object image positions predicted by the prediction calculation unit 13.

In the automatic focusing apparatus shown in FIG. 2, the object image moving amount calculation sections 17 and 18 calculate the moving amounts of the first and second object images on the basis of the first and second object image positions on the first and second photoelectric transducer arrays 15 and 16 in the AFIC 11, and the first and second object image positions after the elapse of the first predetermined period of time. On the basis of the output from the moving amount calculation unit 12, the object image position prediction calculation sections 19 and 20 calculate the first and second object image positions after the elapse of the second predetermined period of time following the first predetermined period of time. On the basis of the predicted first and second object image positions predicted by the prediction calculation unit 13, the lens driving amount calculation unit 14 calculates a necessary lens driving amount.

In this manner, since the first and second object image signals at different times are compared with each other, the moving amounts are detected in correspondence with the first and second object images, and the object image positions after an elapse of a predetermined period of time are also predicted in correspondence with the first and second object images, thereby predicting the movement of objects.

The principle of focus detection will be explained below from the viewpoint of the relationship among an object, a camera, and a sensor with reference to FIGS. 3A through 3D.

For example, as shown in FIG. 3A, when an object 1 approaches a camera 2 straight (in a direction of an arrow $G_3$ in FIG. 3A), first and second object images on first and second sensors move outwardly during a time interval between a time $t_0$ and a time $t_1$ according to the principle of a focus detection apparatus (to be described later). In this case, moving amounts $\Delta x_L$ and $\Delta x_R$ of the object images are equal to each other.

As shown in FIG. 3B, when the object 1 moves parallel to a lateral direction (a direction of an arrow $G_1$ in FIG. 3B) perpendicular to the optical axis of the camera 2, the two object images move in the same direction. In this case, the moving amounts $\Delta x_L$ and $\Delta x_R$ of the object images are equal to each other.

Furthermore, as shown in FIG. 3C, when the object 1 approaches the left side of the camera 2 (in a direction of an arrow $G_4$ in FIG. 3C), a first object image (L) largely moves outwardly since an outward moving amount due to approaching movement, and a moving amount to the left side due to parallel movement to the left side are added to each other. On the other hand, a second object image (R) has a small moving amount since the outward moving amount due to approaching movement and the moving amount to the left side due to parallel movement to the left side cancel each other.

Similarly, as shown in FIG. 3D, when the object 1 moves backward to the left side from the camera 2, a first object image (L) has a small moving amount since an inward moving amount due to moving-away movement and a moving amount to the left side due to parallel movement to the left side cancel each other. On the other hand, a second object image (R) largely moves inwardly since the inward moving amount due to moving-away movement and the moving amount to the left side due to parallel movement to the left side are added to each other.

Based on object images at times $t_0$ and $t_1$, the moving mounts $\Delta x_L$ and $\Delta x_R$ of the first and second object images are detected by, e.g., a correlation calculation means (to be described later). If a sign "+" is assigned to define a movement to the right, the moving amount of an object image in the optical axis direction can be obtained by $\Delta x_R - \Delta x_L$, and the moving amount of an object image in the lateral direction can be obtained by $\Delta x_R + \Delta x_L$. If the moving amounts $\Delta x_L$ and $\Delta x_R$ of the object image from the time $t_0$ to the time $t_1$ are obtained, the position of the object image at a time $t_2$ can be predicted.

If it is assumed that an object is moving at a constant speed, the moving speed of the object image in the lateral direction is a constant speed. The moving speed of the object image in the optical axis direction can be considered as a constant speed in a very short time interval although it cannot become a constant speed in a strict sense, as will be described later.

Therefore, the predicted position of the first object image at the time $t_2$ is moved by $\Delta x_L'$ given by the following equation (1) from the object image position at the time $t_1$.

$$\Delta x_L' = \frac{t_2 - t_1}{t_1 - t_0} \cdot \Delta x_L \tag{1}$$

Similarly, the predicted position of the second object image is moved by $\Delta x_R'$ given by the following equation (2).

$$\Delta x_R' = \frac{t_2 - t_1}{t_1 - t_0} \cdot \Delta x_R \quad (2)$$

If the interval between the first and second object images at the time $t_1$, i.e., a shift amount is o represented by $\Delta Z$, a predicted shift amount $\Delta Z'$ at the time $t_2$ is given by:

$$\Delta Z' = \Delta Z + (\Delta x_R' - \Delta x_L') \quad (3)$$

$$\Delta Z + \frac{t_2 - t_1}{t_1 - t_0}(\Delta x_R - \Delta x_L)$$

Based on this predicted shift amount $\Delta Z'$, a lens driving amount is calculated. When the time $t_2$ is set to be a time required for driving a lens driving amount to attain an in-focus state upon completion of the lens driving operation, or a time up to the beginning of exposure, or a time up to electronic flash emission, an object can be focused, or a focused photograph can be obtained.

The moving speed of an object image on the photoelectric transducer array when the object moves at a constant speed in the optical axis direction will be explained in detail below.

Figure 4:
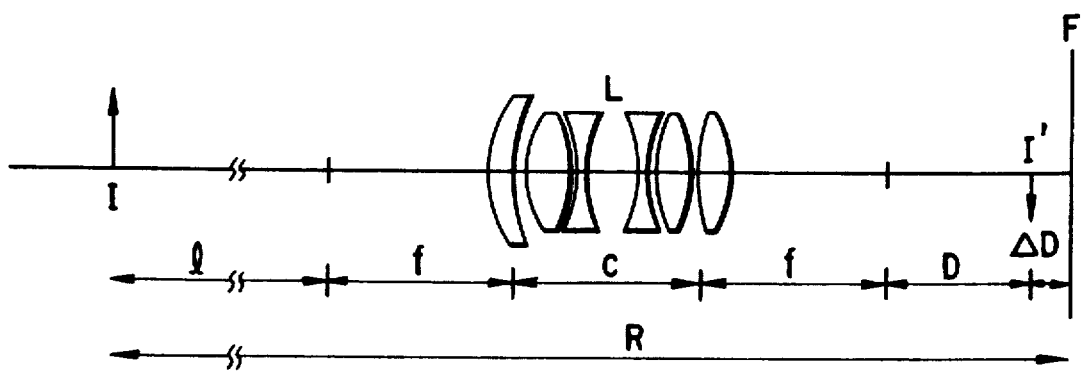

More specifically, in FIG. 4, the image of an object (I) is focused as an object image (I') near a film surface (F) by a photographing lens (L). If an equivalent focal length of the photographing lens (L) is represented by f, an equivalent thickness is represented by c, and a distance from the film surface to the object image, i.e., a defocus amount is represented by $\Delta D$, a distance R from the film surface to the object is calculated as:

$$R = l + 2f + c + D + \Delta D = l + 2f + c + \frac{f^2}{l} + \Delta D \quad (4)$$

Therefore, the defocus amount $\Delta D$ is given by:

$$\Delta D = R - l - 2f - c - \frac{f^2}{l} \quad (5)$$

If the lens is assumed to be fixed, since $R - l - 2f - c = k$, we have:

$$\Delta D = k - \frac{f^2}{l} \quad (6)$$

If a shift amount of an object image interval on the photoelectric transducer arrays with respect to an object image interval in an in-focus state is represented by $\Delta Z$, the defocus amount $\Delta D$ is expressed as:

$$\Delta D = \frac{B}{A - \Delta Z} - C \quad (7)$$

where A, B, and C are constants determined by an AF detection optical system, and for example, $A = 2$, $B = 170$, and $C = 85$. This fact is disclosed in Published Unexamined Japanese Patent Application No. 62-100718. Thus, we have:

$$\Delta Z = A - \frac{B}{k + C} - \frac{f^2 \cdot B}{k + C} \cdot \frac{l}{(k + C)l - f^2} \quad (8)$$

If it is assumed that the object is moving at a constant speed, $l = vt + l_0$, $\Delta Z$ can be rewritten as:

$$\Delta Z = A - \frac{B}{k + C} - \frac{f^2 \cdot B}{k + C} \cdot \frac{l}{(k + C)(vt + l_0) - f^2} \quad (9)$$

Therefore, the movement of the object image is expressed by the above equation, and does not have a constant speed in a strict sense.

However, if the moving amount near an in-focus point of an object, which is moving to have a focal length $f = 100$ mm, a distance $= 10$ m, and a speed $= 50$ km/hour, is calculated with $A = 2$, $B = 170$, and $C = 85$, it is given by:

$$\Delta Z = 0.0233 - \{0.0165/(t + 0.7116)\}$$

The moving amounts up to 0.3 sec are summarized in a table below.

| t | ΔZ |
|---|---|
| 0 | 0 |
| 0.05 | 0.0016 |
| 0.1 | 0.0030 |
| 0.15 | 0.0042 |
| 0.2 | 0.0052 |
| 0.25 | 0.0061 |
| 0.3 | 0.0069 |

In focus adjustment of a camera, since the detection interval is 0.1 to 0.2 sec, and the prediction time is 0.2 to 0.3 sec, the moving speed of the object image in the optical axis direction can be considered as a constant speed. When an object moving at a high speed is detected at a close distance, since its moving speed cannot be considered as a constant speed, equation (9) described above may be modified to the form of $\Delta Z = \alpha - \{\gamma/(t + \beta)\}$. In this case, the moving amount in the optical axis direction can be calculated based on the moving amount of the object image in units of moving amounts in the lateral and optical axis directions in correspondence with the first and second objects.

The coefficient $\alpha$ in the above equation is obtained by the focal length and the extension amount of a focus lens, and the coefficients $\beta$ and $\gamma$ can be obtained by an image shift amount between the times $t_0$ and $t_1$. Alternatively, the coefficients $\beta$ and $\gamma$ may be obtained by image shift amounts at the times $t_0$, $t_1$, and $t_2$.

Figure 5:
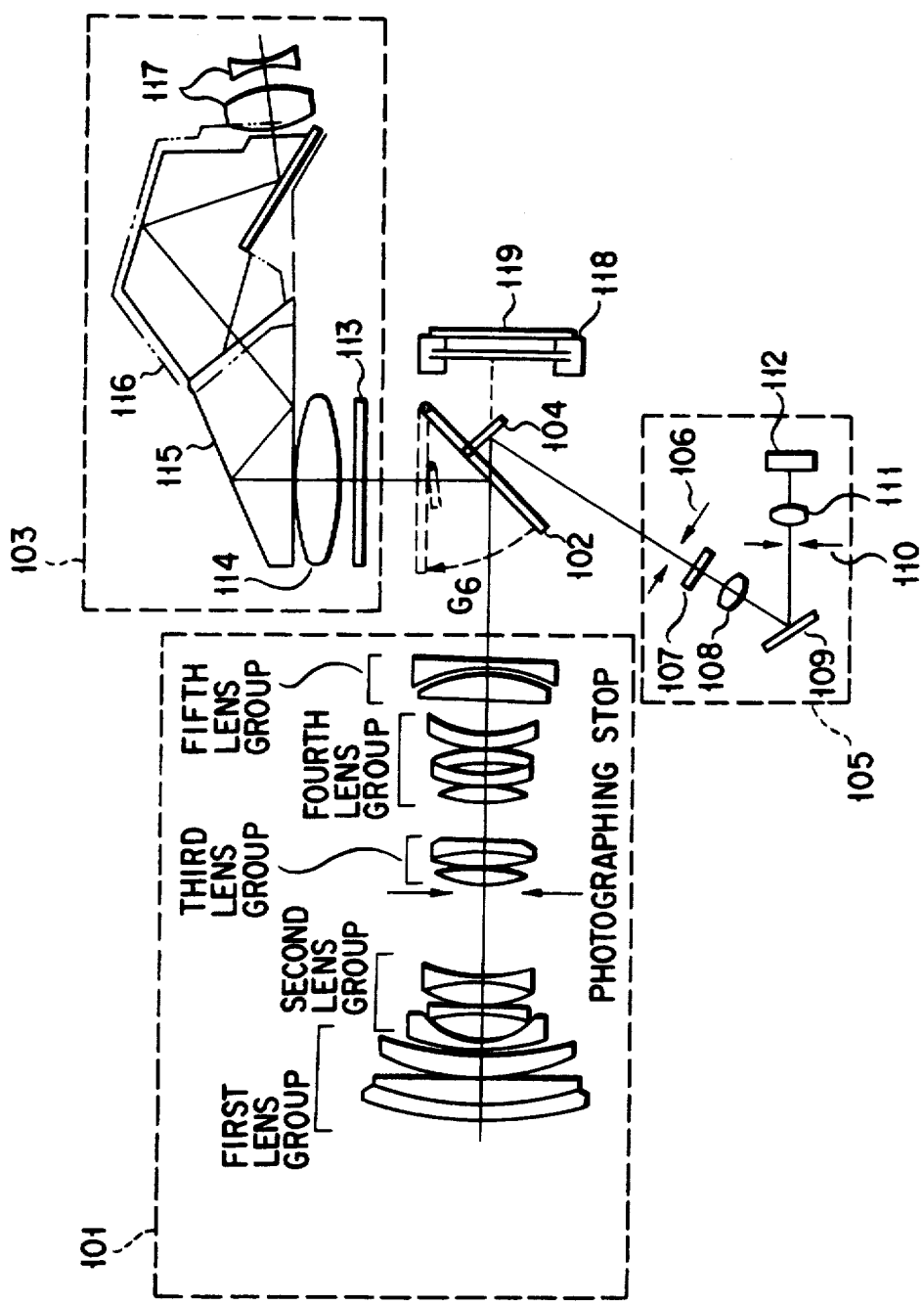
FIG. 5 is a diagram of a camera incorporating a zoom lens mechanism, to which the automatic focusing apparatus of the present invention is applied.

FIG. 5 is a diagram of a camera incorporating a zoom lens mechanism, which adopts the automatic focusing apparatus of the present invention. In FIG. 5, object light becomes incident on a main mirror 102 through a photographing lens group 101 comprising five lens groups, and a photographing stop. In the photographing lens group 101, a focusing operation is performed by the first and second lens groups, and a zooming operation is performed by the third and fourth lens groups. The fifth lens group is fixed. In the zooming operation, the third and fourth lens groups are moved, and at the same time, the first and second lens groups are driven by a cam structure, thus preventing a defocusing state in the zooming operation.

The main mirror 102 comprises a half mirror, and light ⅔ a total incident light amount is reflected toward a finder optical system 103. The remaining light, i.e., the light ⅓ the total incident light amount is transmitted through the main mirror, is reflected by a sub mirror 104, and is then guided toward an AF optical system 105. On the other hand, the AF optical system 105 is constituted by a field stop 106, an infrared cut filter 107, a condenser lens 108, a mirror 109, a re-focusing stop 110, a re-focusing lens 111, and an AFIC 112.

The field stop 106 determines a field of view for AF detection from a photographing frame, so that two optical images split by the re-focusing lens 111 do not interfere with each other. The infrared cut filter 107 cuts infrared light unnecessary for AF detection, and prevents an aberration caused by infrared light. The condenser lens 108 is arranged at the focal plane of the object optical image, i.e., near the film equivalent plane, and re-focuses an object optical image focused near the film equivalent plane on the AFIC 112 together with the re-focusing lens 111. The re-focusing stop 110 selects two light beams from object light beams which are symmetrical about the optical axis and can be paired and are transmitted through the condenser lens 108, and passes the selected light beams. The two light beams passing through the re-focusing stop are re-focused on the two photoelectric transducer arrays on the AFIC 112.

The finder optical system 103 is constituted by a focusing screen 113, a condenser lens 114, a prism 115, a mold roof mirror 116, and an eyepiece lens 117. An object optical image transmitted through the photographing lens group 101 is focused on the focusing screen 113. The focused image can be observed by a photographer through the condenser lens 114 and the eyepiece lens 117.

The main mirror 102 and the sub mirror 104 escape to the position indicated by the dotted lines in FIG. 5 (in a direction indicated by an arrow $G_6$ in FIG. 5) upon exposure of a film. Object light transmitted through the photographing lens group 101 is exposed on a film 119 from when the front curtain of a shutter 118 is opened until the rear curtain thereof is closed.

Figure 6:
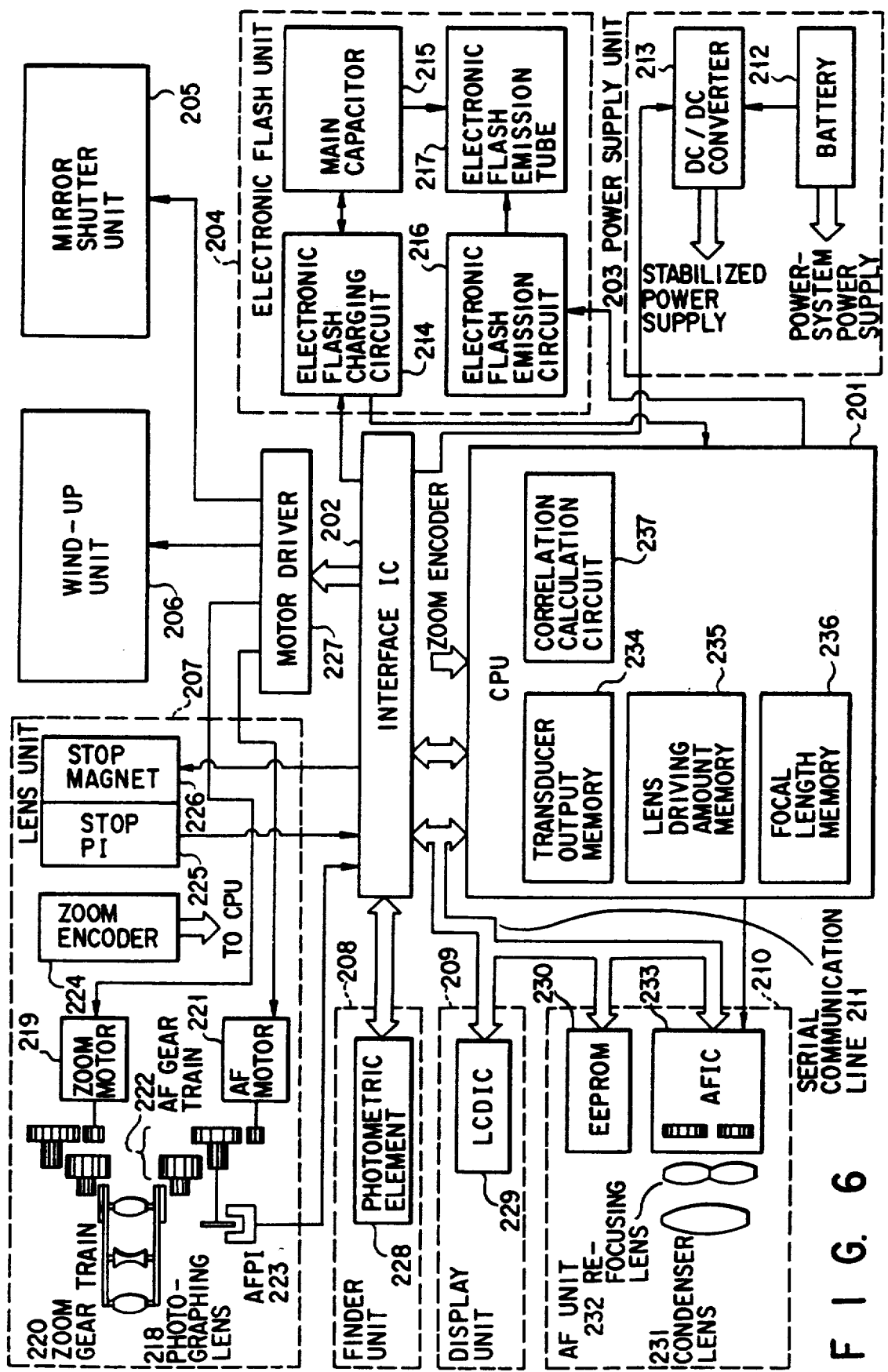
FIG. 6 is a block diagram of a camera according to an embodiment of the present invention.

FIG. 6 is a block diagram of the camera of this embodiment. The camera system of this embodiment is constituted by a CPU 201, an interface IC 202, a power supply unit 203, an electronic flash unit 204, a mirror shutter unit 205, a windup unit 206, a lens unit 207, a finder unit 208, a display unit 209, an AF unit 210, and the like.

The CPU 201 controls the overall camera system, and exchanges data with the interface IC 202, an LCDIC 229, an EEPROM 230, and an AFIC 233 through a serial communication line 211. Another communication line is coupled between the CPU 201 and the interface IC 202, and is used for inputting various analog signals, PI (photointerrupter) waveshaped signals, and the like. The analog signals are supplied to an A/D conversion input terminal of the CPU 201, and are converted into digital signals. Furthermore, the CPU 201 has various calculation sections, a data storage section, and a time measurement section.

The interface IC 202 comprises a Bi-CMOSIC including both digital and analog circuits, and is constituted by an analog processing section including motor and magnet driving circuits, a photometric circuit, a battery check circuit, back-light LED and auxiliary light LED turn-on circuits, a waveshaping circuit for a photointerrupter, and the like, and a digital processing section including an input serial communication data conversion function for switches (SWs), and the like.

The power supply unit 203 supplies two systems of power supplies. One power supply is used for drivers for motors and magnets, which require high power, and a voltage from a battery 212 is always supplied. The other power supply is a small-signal power supply stabilized by a DC/DC converter 213, and is controlled by the CPU 201 through the interface IC 202.

The electronic flash unit 204 is constituted by an electronic flash charger 214, a main capacitor 215, an electronic flash emission circuit 216, an electronic flash emission tube 217, and the like. When the electronic flash device is required to emit light in a low-brightness or back-light state, the electronic flash charger 214 boosts a battery voltage through the interface IC 202 according to a control signal from the CPU 201, thereby charging the main capacitor 215. At the same time, the electronic flash charger 214 inputs a voltage-divided charging voltage to the A/D conversion input terminal of the CPU 201. Thus, the CPU 201 controls the charging voltage. When the charging voltage reaches a predetermined level, the CPU 201 supplies a charging stop signal to the electronic flash charger 214 through the interface IC 202, thus stopping the charging operation of the main capacitor 215. The CPU 201 controls the start and end of emission of the electronic flash emission tube 217 through the electronic flash emission circuit 216 at a predetermined timing upon exposure of a film.

The electronic flash emission timing modes include a front curtain emission mode in which light is emitted upon input of a shutter front curtain travel end switch (not shown), a rear curtain emission mode in which light is emitted immediately before the beginning of travel of the rear curtain, a multi-emission mode in which light is emitted a plurality of times in an equal light amount at equal time intervals from the end of the travel of the front curtain to a time immediately before the beginning of the travel of the rear curtain, and the like.

The lens unit 207 is constituted by a photographing lens 218, a zoom motor 219, a zoom gear train 220, an AF motor 221, an AF gear train 222, an AFPI 223, a zoom encoder 224, a stop PI 225, a stop magnet 226, and the like. The zoom motor 219 and the AF motor 221 are controlled by the CPU 201 through the interface IC 202 and a motor driver 227 together with the mirror shutter unit 205 and the windup unit 206. The rotation of the zoom motor 219 is decelerated by the zoom gear train 220, thus driving the zoom system of the photographing lens 218. The zoom encoder 224 is constituted by six switches arranged around a mirror frame for supporting the photographing lens 218, and ON/OFF data from the six switches are input to the CPU 201, thereby detecting the absolute position of the zoom lens.

The CPU 201 obtains a focal length on the basis of the absolute position of the zoom lens, and stores it in a focal length memory 236. The rotation of the AF motor 221 is decelerated by the AF gear train 222, thus driving a focus system lens of the photographing lens 218. On the other hand, the output from the AF photointerrupter (PI) 223 is extracted from an intermediate gear of the AF gear train 222. The output from the AFPI 223 is waveshaped by the interface IC 202, and is supplied to the CPU 201, thus forming AF lens driving amount feedback pulses. The CPU 201 counts the number of pulses to control the driving amount of the AF lens. The extension amount of the AF lens from its mechanical stopper or infinity reference position is stored in a lens driving amount memory 235 in the CPU 201 as the number of pulses from the AFPI 223.

Photometric elements 228 in the finder unit 208 are controlled by the CPU 201 through the interface IC 202. Photocurrents generated by the photometric element 228 are supplied to the interface IC 202 in units of eight elements, and are subjected to current/voltage conversion. Only the output from the element designated by the CPU 201 is supplied from the interface IC 202 to the A/D conversion input terminal of the CPU 201, and is converted into a digital signal. The digital signal is used in a photometric calculation.

The AF unit 210 is constituted by an EEPROM 230, a condenser lens 231, a re-focusing lens 232, the AFIC 233, and the like. Some light components of an object optical image are split into two images by the condenser lens 231 and the re-focusing lens 232, and the two images are received by two photoelectric transducer arrays on the AFIC 233. The AFIC 233 generates digital outputs according to the intensities of the received light in units of transducers. These digital outputs are supplied to the CPU 201, and are stored in a transducer output memory 234 in the CPU 201.

The CPU 201 causes an internal correlation calculation circuit 237 to calculate an image interval between the two split images, or the moving amounts of images after an elapse of a predetermined period of time on the basis of the stored transducer outputs. Furthermore, the CPU 201 controls the photoelectric conversion operation of the AFIC 233. The EEPROM 230 is written with various adjustment data such as data for correcting nonuniformity of photoelectric transducer outputs, a two-image interval in an in-focus state, and the like upon delivery from a factory. During a camera operation, the EEPROM stores data such as film frame count data, which must be preserved after a power switch is turned off.

The AF optical system will be described below.

Figure 7:
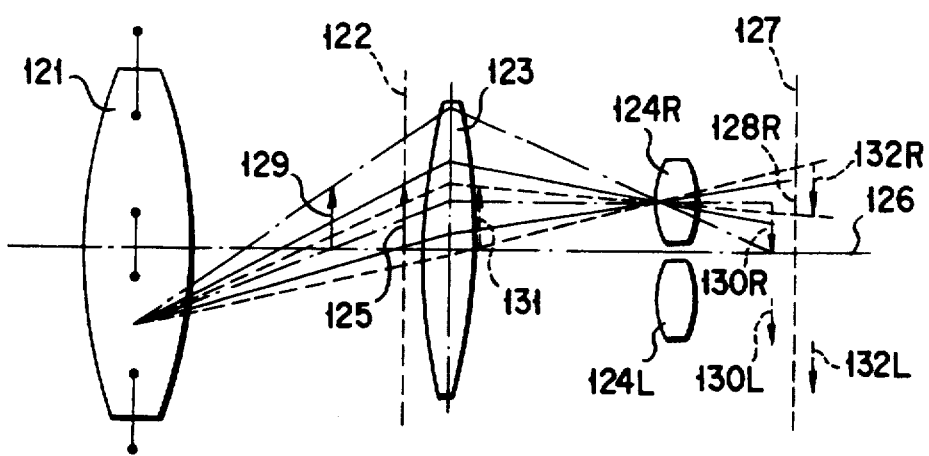
FIG. 7 is a diagram showing the arrangement of an AF optical system shown in FIG. 6.

As shown in FIG. 7, the AF optical system 105 is constituted by a condenser lens 123 located near a focal plane 122 of a photographing lens 121, and a pair of re-focusing lenses 124L and 124R. In an in-focus state of the photographing lens 121, an object image 125 is focused on the focal plane 122. The object image 125 is re-formed, as first and second object images 128L and 128R, on a secondary focal plane 127 (photoelectric transducer arrays) perpendicular to an optical axis 126 by the condenser lens 123 and the pair of re-focusing lenses 124L and 124R.

When the photographing lens 121 is in a near-focus state, i.e., when an object image 129 is formed in front of the focal plane 122, the object image 129 is refocused to be perpendicular to the optical axis 126 as first and second object images 130L and 130R at positions near the optical axis 126. When the photographing lens 121 is in a far-focus state, i.e., when an object image 131 is formed behind the focal plane 122, the object image 131 is re-focused to be perpendicular to the optical axis 126 as first and second object images 132L and 132R at positions separated away from the optical axis 126. These first and second object images are directed in the same direction, and when an interval between the corresponding portions of the two images is detected, the focusing state including the near- and far-focus states of the photographing lens 121 can be detected.

Then, brightness data of an object is calculated on the basis of the object image signals and response times of the photoelectric transducers. The brightness data is utilized in a calculation of a film exposure value, is used for judging reliability of distance measurement data, necessity of AF auxiliary light, and is used in moving object judgment.

A correlation calculation is made using the two object image signals. In the apparatus of the present invention, two different correlation calculations are performed. In one correlation calculation, like in a conventional focus detection apparatus, a correlation calculation is performed between first and second object images split by a detection optical system, and a defocus amount is obtained based on a shift amount between the two images. In the other correlation calculation, a correlation calculation is performed between an object image at a time $t_0$ and the object image at a time $t_1$ to obtain the moving amount of the object image.

The correlation calculation between first and second object images will be explained first.

For the sake of simplicity, a first object image is represented by an image L, a first object image signal is represented by L(I), a second object image is represented by an image R, and a second object image signal is represented by R(I) I is the transducer number, and I = 1, 2, 3, ..., 64 from the left side in this embodiment. More specifically, each transducer array includes 64 transducers.

Figure 8:
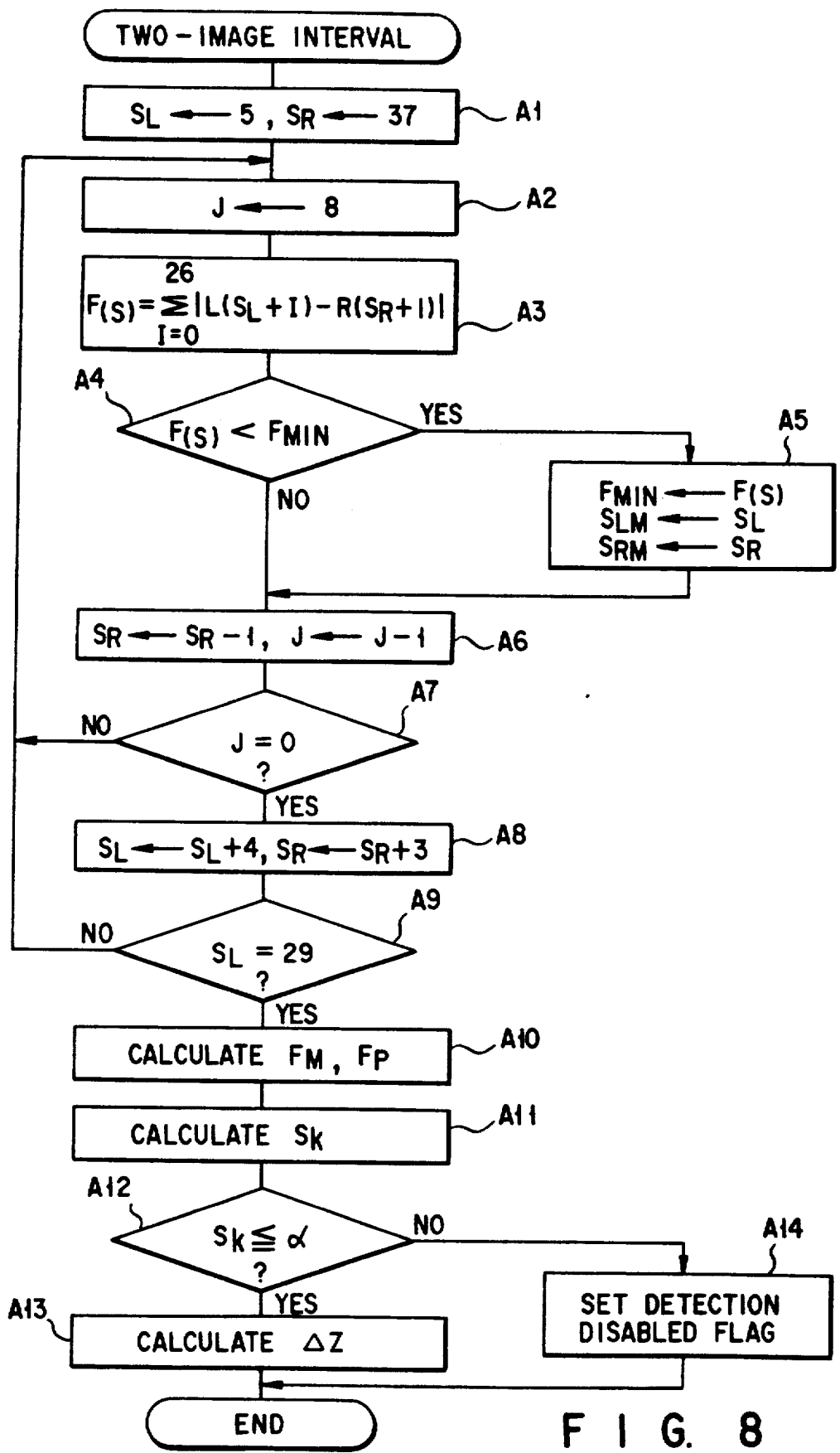
FIG. 8 is a flow chart for explaining a correlation calculation between first and second object images.

The correlation calculation will be described below with reference to the flow chart shown in FIG. 8. Initial values "5", "37", and "8" are respectively set in variables $S_L$, $S_R$, and J (steps A1 and A2). $S_L$ is a variable for storing the start number of a small block transducer array for detecting a correlation from object image signals $L_{(I)}$, $S_R$ is similarly a variable for storing the start number of a small block transducer array for detecting a correlation from object image signals $R_{(I)}$, and J is a variable for counting the number of times of movements of the small blocks in the object image signals $L_{(I)}$. A correlation output $F_{(S)}$ is then calculated by the following equation (step A3):

$$F_{(S)} = \sum_{I=0}^{26} |L(S_L + I) - R(S_R + I)| \qquad (10)$$

(for $S = S_L - S_R$)

In this case, the number of transducers in each small block is 27. The number of transducers in the small block is determined by the size of a distance measurement frame displayed in the finder, and the magnification of the detection optical system.

The minimum value of the correlation output $F_{(S)}$ is detected (step A4). More specifically, $F_{(S)}$ is compared with $F_{MIN}$, and if $F_{(S)}$ is smaller than $F_{MIN}$, $F_{(S)}$ is substituted in $F_{MIN}$. $S_L$ and $S_R$ at that time are stored in $S_{LM}$ and $S_{RM}$ (step A5), and the flow then advances to step A6. If it is determined in step A4 that $F_{(S)}$ is larger than $F_{MIN}$, the flow directly advances to step A6.

In step A6, 1 is subtracted from $S_R$, and 1 is subtracted from J. If J is not 0 (step A7), the correlation calculation given by equation (10) is repeated. More specifically, the small block position in the image L is fixed, and correlations are calculated while shifting the small block position in the image R in units of transducers. If it is determined that J has reached 0, 4 is added to $S_L$, and 3 is added to $S_R$ to continue a correlation calculation (step A8). More specifically, the correlation calculation is repeated while shifting the small block position in the image L by four transducers. If it is determined that the value of $S_L$ has reached 29, the correlation calculation is ended (step A9).

With the above-mentioned processing, a correlation calculation is efficiently performed, and the minimum correlation output can be detected. The position of a small block showing the minimum correlation output represents the positional relationship of image signals having the highest correlation therebetween.

The correlation of image signals in the detected block having the highest correlation is then judged. In step A10, values $F_M$ and $F_P$ are calculated as follows:

$$F_M = \sum_{I=0}^{26} |L_{(SLM+I)} - R_{(SRM+I-1)}| \quad (11)$$

$$F_P = \sum_{I=0}^{26} |(L_{(SLM+I)} - R_{(SRM+I+1)}| \quad (12)$$

Figure 9A:
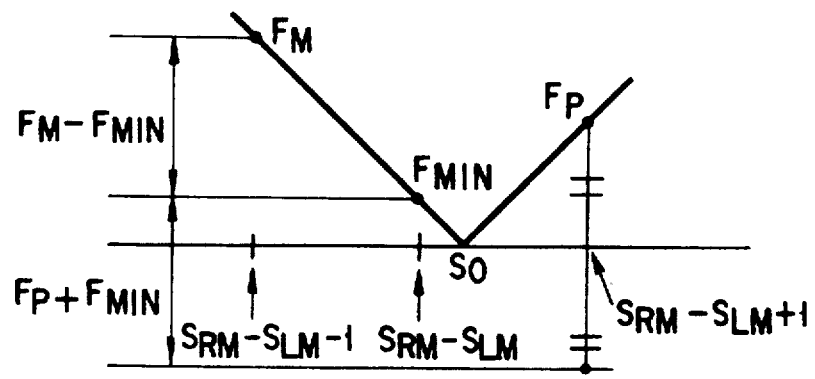
FIGS. 9A and 9B are views for explaining the relationship among correlation outputs $F_M$, $F_{MIN}$, and $F_P$.
Figure 9B:
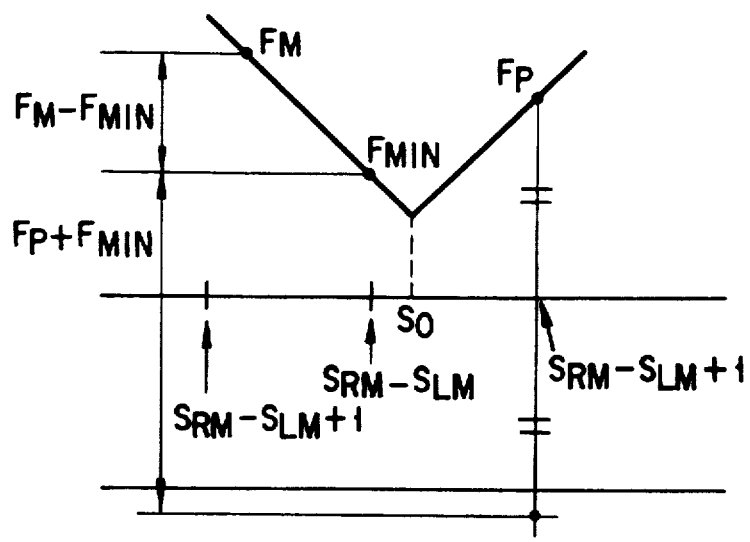

More specifically, correlation outputs obtained when the object image R is shifted by ql transducers from the block position showing the minimum correlation output are calculated. At this time, $F_M$, $F_{MIN}$, and $F_P$ have a relationship, as shown in FIG. 9A or 9B. If the detected image interval has a high correlation, the correlation output $F_{(S)}$ becomes zero at a point $S_O$, as shown in FIG. 9A. On the other hand, if the image interval has a low correlation, the correlation output $F_{(S)}$ does not become zero, as shown in FIG. 9B.

A correlation index $S_k$ given by the following equations (13) and (14) is calculated (step A11):

When $F_M \geq F_P$, $S_k = (F_P + F_{MIN})/(F_M - F_{MIN})$ (13)

When $F_M < F_P$, $S_k = (F_M + F_{MIN})/(F_P - F_{MIN})$ (14)

As can be seen from FIGS. 9A and 9B, when the correlation is high, the correlation index $S_k$ satisfies $S_k = 1$; otherwise, $S_k > 1$. Therefore, it can be determined based on the value of the correlation index $S_k$ whether or not an image shift amount to be detected is reliable (step A12). In practice, the correlation index $S_k$ cannot become 1 since the non-coincidence components of the first and second object images are generated due to a variation in optical system, noise of the photoelectric transducers, conversion error, and the like. Therefore, when $S_k \leq \alpha$, it is determined that the correlation is high, and an image shift amount is calculated (step A13). When $S_k > \alpha$, it is determined that the correlation is low, and hence, it is determined that AF detection is disabled (step A14).

Note that a judgment value $\alpha$ falls within a range between 2 and 3. However, this value is stored as an adjusted value in units of products since it varies depending on products.

When a dark current is generated in the photoelectric transducers, the probability that the correlation is deteriorated, and AF detection is disabled is increased. Thus, the judgment value is increased on the basis of the magnitude of a dark current or an integration time period, or a combination of a temperature and an integration time period. When auxiliary light is turned on, the correlation is deteriorated under the influence of the color of auxiliary light, aberration, and the like. Thus, the judgment value is increased to prevent AF detection from being easily disabled. When a correlation is found, an image shift amount $S_O$ is calculated as follows on the basis of the relationship shown in FIGS. 9A and 9B:

When $F_M \geq F_P$, (15)

$$S_O = S_{RM} - S_{LM} + \frac{1}{2} \cdot \{(F_M - F_P)/(F_M - F_{MIN})\}$$

When $F_M < F_P$, (16)

$$S_O = S_{RM} - S_{LM} + \frac{1}{2} \cdot \{(F_M - F_P)/(F_P - F_{MIN})\}$$

An image shift amount $\Delta Z$ from the in-focus state is calculated as:

$$\Delta Z = S_O - \Delta Z_0 \times \{1 + C \times (T - T_0)\} \quad (17)$$

where $\Delta Z_0$ is the image shift amount in the in-focus state. The image shift amount $\Delta Z_0$ is measured in units of products, and is stored in a storage device. C is the temperature coefficient, T is the temperature detected by a temperature detection means, $T_0$ is the temperature when the $\Delta Z_0$ is measured. The temperature correction of the image shift amount in the in-focus state caused by a change in temperature of the optical system is made by $C \times (T - T_0)$. Based on the image shift amount $\Delta Z$, the defocus amount $\Delta D$ on the optical axis can be calculated as:

$$\Delta D = \frac{B}{A - \Delta Z} - C \quad (18)$$

(where A, B, and C are constants determined by the optical system)

Since many methods of obtaining a lens driving amount based on the defocus amount $\Delta D$ on the optical axis have been conventionally proposed, a detailed description thereof will be omitted here. For example, in a method disclosed in Published Unexamined Japanese Patent Application No. 64-54409, the lens driving amount can be obtained as shown in the following equation (19)

$$\Delta L = b - \frac{a \times b}{a \times \Delta D} + c \times \Delta D \quad (19)$$

(where a, b, and c are constants obtained in units of focal lengths)

Furthermore, the in-focus state can be attained by driving the photographing lens by $\Delta L$ if movement of an object (to be described later) is ignored.

A correlation calculation for obtaining movement of an object image will be described below.

Object images $L'_{(I)}$ and $R'_{(I)}$ at a time $t_0$, correlation block positions $S_{LM}'$ and $S_{RM}'$, a correlation coefficient $S_k'$, and an image shift amount $\Delta Z'$ obtained by the above-mentioned correlation calculation between the two images are temporarily stored in a storage area of the CPU. Then, object image signals $L_{(I)}$ and $R_{(I)}$ at a time $t_1$ are detected.

First, a correlation calculation is performed for the first object image signals, i.e., the object image signal $L'_{(I)}$ at the time $t_0$ and the object image signal $L_{(I)}$ at the time $t_1$.

Processing for obtaining a correlation will be described below with reference to FIGS. 10 and 11.

When detection of movement of an object image is started (step B1), $S_{LM}' - 10$ is substituted in the variable $S_L$ (step B2). A variable J is a variable for counting a correlation range, and an initial value 20 is substituted in the variable J in this case (step B3). If it is determined in step B1 that the moving amount has already been detected, the flow advances to step B6 through steps B4 and B5 (to be described later). In step B6, a correlation output $F_{(S)}$ is calculated by the following correlation equation given by:

$$F_{(S)} = \sum_{I=0}^{26} |L'_{(S_{LM'}+I)} - L_{(S_L+J+I)}| \qquad (20)$$

Then, $F_{(S)}$ and $F_{MIN}$ are compared with each other like in the above-mentioned correlation calculation (step B7). If $F_{(S)}$ is smaller than $F_{MIN}$, $F_{(S)}$ is substituted in $F_{MIN}$, and $S_L$ at that time is stored in $S_{LM}$ (step B8). In this case, the number of transducers in a block from which the correlation is calculated is the same as that of the above-mentioned block for obtaining the image shift amount, i.e., 27. 1 is added to $S_L$, and 1 is subtracted from J (step B9). The corresponding output $F_{(S)}$ is repetitively calculated until J becomes a negative value (step B10). In this case, a correlation is calculated by changing up to $\pm 10$ transducers. This correlation range is determined by a moving amount range to be detected.

Therefore, when the lens has a small focal length, or when the object distance is large, or when the time interval between the times $t_0$ and $t_1$ is short, i.e., when the brightness of an object is high, since it is assumed that the moving amount of an object image is small, the correlation range is narrowed. The narrowed correlation range can shorten the calculation time period. On the contrary, when it is assumed that the moving amount of an object image is large, the correlation range is widened. In FIG. 10, when $S_L + I$ exceeds an effective transducer range of the first photoelectric transducers, i.e., when there are no transducers, or when $S_L + I$ is eclipsed by the optical system, $F_{(S)}$ is not calculated.

The correlation is then judged. Like in the above-mentioned calculation of the interval between the first and second object images, correlation outputs are calculated as (step B11):

$$F_M = \sum_{I=0}^{26} |L'_{(S_{LM'}+I)} - L_{(S_{LM}+I-1)}| \qquad (21)$$

$$F_P = \sum_{I=0}^{26} |L'_{(S_{LM'}+I)} - L_{(S_{LM}+I+1)}| \qquad (22)$$

The correlation coefficient $S_k$ can be calculated using equations (13) and (14) described above (step B12). When $S_k \leq \beta$, it is determined that the correlation is high, and a moving amount is calculated (step B13).

The judgment value $\beta$ is set to be larger than that for obtaining the interval between the first and second object images ($\beta$ is set to be about 7). When an object is moving, the waveform often changes. For this reason, the probability that the correlation is deteriorated is high. As the moving amount of an object image is larger, the correlation tends to be deteriorated. For this reason, when the lens has a large focal length, or when the object distance is short, or when the time interval between the times $t_0$ and $t_1$ is long, i.e., when the brightness of an object is low, the judgment value is increased.

A moving amount $\Delta x_L$ of an image is then calculated (step B14). The moving amount is calculated like in the above-mentioned calculation of the interval between the first and second object images.

When $F_M \geq F_P$, $\qquad (23)$ $$\Delta x_L = S_{LM} - S_{LM'} + \frac{1}{2} \cdot \{(F_M - F_P)/(F_M - F_{MIN})\}$$

When $F_M < F_P$, $\qquad (24)$ $$\Delta x_L = S_{LM} - S_{LM'} + \frac{1}{2} \cdot \{(F_M - F_P)/(F_P - F_{MIN})\}$$

Similarly, a correlation calculation is performed for the second object image to obtain a correlation block position $S_{RM}$ and a moving amount $\Delta x_R$.

When the moving amounts $\Delta x_L$ and $\Delta x_R$ of the first and second object images are obtained, the image shift amount $\Delta Z$ at the time $t_1$ is calculated as follows on the basis of the image shift amount $\Delta Z'$ at the time $t_0$:

$$\Delta Z = \Delta Z' + \Delta x_R \Delta x_L \qquad (25)$$

Although the lens driving amount can be obtained based on $\Delta Z$, an image shift amount $\Delta Z''$ at the time $t_2$ is predicted, as shown in the following equation (26), in this embodiment:

$$\Delta Z'' = \Delta Z + \frac{t_2 - t_1}{t_1 - t_0} (\Delta x_R - \Delta x_L) \qquad (26)$$

$$= \Delta Z' + \frac{t_2 - t_0}{t_1 - t_0} (\Delta x_R - \Delta x_L)$$

The time $t_2$ is obtained by a method (to be described later), and the lens is driven by an amount based on $\Delta Z''$, so that an object, which is moving at the time $t_2$, can be focused.

If it is determined in step B13 that $S_k \leq \beta$ is not satisfied, the flow advances to step B15, and a detection disabled flag is set.

When the moving speed $(\Delta x_R - \Delta x_L)/(t_1 - t_0)$ of an object image is too high, it is determined that the detection value is not reliable, and the image shift amount is not predicted. On the other hand, when the moving speed of the object image is low, and is considered as a detection error, the moving speed is set to be 0. This judgment value is increased when it is predicted according to the focal length, the object distance, or the brightness of the object that the moving amount of the object image is large with respect to the moving amount of the object.

A case will be described below wherein a lens driving operation is not performed at the time $t_2$, and movement of the object image is detected at a time $t_3$ to follow detection at the time $t_1$.

In this case, an object image position at the time $t_3$ can be predicted on the basis of an object image moving amount between the time $t_0$ and the time $t_1$. When the moving amount is detected near the predicted object image position, the correlation range can be narrowed, and the calculation time period can be shortened. In addition, erroneous detection caused by an object having too high a moving speed, an abrupt change in object, camera-shake, and the like, can be prevented.

Figure 10:
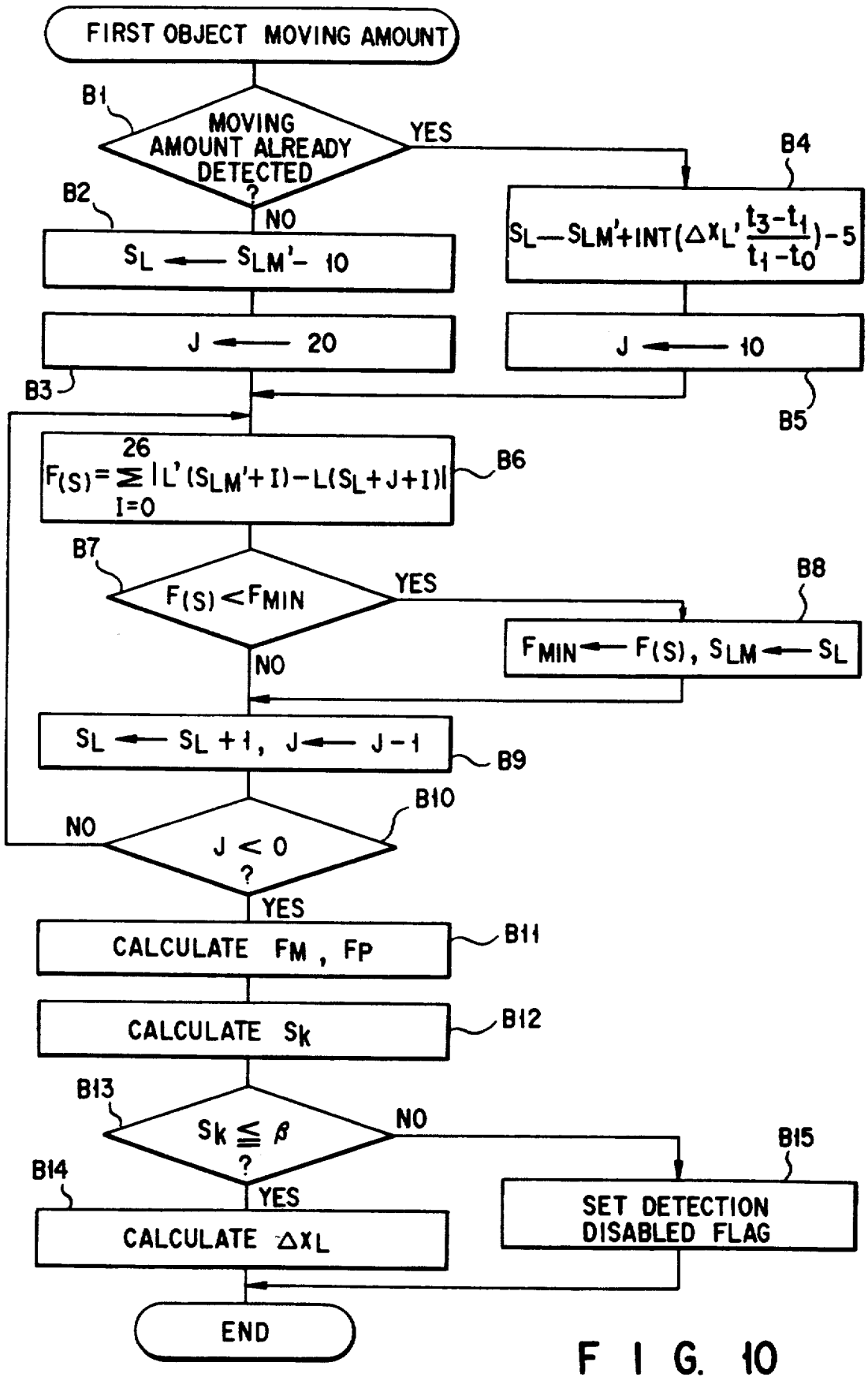
FIG. 10 is a flow chart for explaining an operation for obtaining a first object moving amount.

In the flow chart shown in FIG. 10, in the calculation at the time $t_1$, $S_{LM'} - 10$ is substituted in the variable $S_L$, and 20 is substituted in the variable J, so that movement of the object image is detected within a range of $\pm 10$ transducers with respect to the correlation block detected at the time $t_0$. However, at the time $t_3$, since the moving amount of the object image has already been detected (step B3), the predicted object image position at the time $t_3$ given by following equation (27) is substituted in the variable $S_L$ (step B4), and 10 is substituted in the variable J (step B5).

$$S_{LM} + INT\left(\Delta x_L \times \frac{t_3 - t_1}{t_1 - t_0}\right) - 5 \tag{27}$$

where INT( ) means to calculate an integer by rounding fractions after the decimal point of a value in the parentheses.

In FIG. 10, at the time $t_3$, $S_{LM}$ at the time $t_1$ is substituted in $S_{LM}'$, $\Delta x_L$ is substituted in $\Delta x'_L$, and $L_{(f)}$ is substituted in $L'_{(f)}$.

Thus, the movement of the object image can be detected within a range of $\pm 5$ transducers at the predicted object image position at the time $t_3$. FIG. 11 shows a correlation state at the time $t_3$.

The first and second object images have been described above. When the same correlation calculation as that for detecting the moving amount of the object image is performed, the moving amounts $\Delta x_L'$ and $\Delta x_R'$ of the object images between the time $t_1$ and the time $t_3$ can be obtained.

With the focal length, the object distance, or the brightness of an object from which it is predicted that the moving amount of the object image is small, the correlation range is further narrowed. Alternatively, the correlation range may be determined on the basis of the moving amount $\Delta x_L$ detected at the time $t_1$. For example, when the correlation range is defined by the number of transducers obtained by adding the predetermined number of transducers to a range given as follows, a moving amount corresponding to a change in speed from twice to $\frac{1}{2}$ can be detected.

$$\left(\Delta x_L \times \frac{t_3 - t_1}{t_1 - t_0}\right) \times 2 \text{ to } \left(\Delta x_L \times \frac{t_3 - t_1}{t_1 - t_0}\right) \times \frac{1}{2} \tag{28}$$

Camera-shake detection is performed on the basis of the moving amounts $\Delta x_L$ and $\Delta x_R$ of the object images between the time $t_0$ and the time $t_1$, and the moving amounts $\Delta x_L'$ and $\Delta x_R'$ of the object images between the time $t_1$ and the time $t_3$. When the change amounts or rates of change given by $\Delta x_L/(t_1-t_0)$ and $\Delta x_L'/(t_3-t_1)$ are larger than the judgment value, a camera-shake state is determined, and an alarm display is made. Similarly, whether or not camera-shake occurs is detected upon comparison between $\Delta x_R/(t_1-t_0)$ and $\Delta x_R'/(t_3-t_1)$ or $(\Delta x_R+\Delta x_L)/(t_1-t_0)$ and $(\Delta x_R'+\Delta x_L')/(t_3-t_1)$.

Note that the judgment value is increased according to the focal length, the object distance, or the brightness of an object, from which it is predicted that the moving amount of an object image is large with respect to the moving amount of an object, as described above.

The predicted image shift amount $\Delta Z''$ at the time $t_2$ can be calculated as follows based on the image shift amount $\Delta Z$ at the time $t_1$ obtained from the image shift amount $\Delta Z'$ detected at the time $t_0$, and the object image moving amounts $\Delta x_L$ and $\Delta x_R$ between the time $t_0$ and the time $t_1$:

$$\Delta Z'' = \Delta Z + \frac{t_2 - t_1}{t_3 - t_1} \times (\Delta x_R' - \Delta x_L') \tag{29}$$

Alternatively, by averaging the moving speed of the object image, $\Delta Z''$ is given by:

$$\Delta Z'' = \Delta Z + \frac{1}{2}\left(\frac{\Delta x_R - \Delta x_L}{t_1 - t_0} + \frac{\Delta x_R' - \Delta x_L'}{t_3 - t_1}\right) \times (t_2 - t_1) \tag{30}$$

Whether or not the moving speed is averaged can be judged according to the focal length, the object distance, the brightness of the object, and the detected moving speed of the object image. This is because movement of the object image with respect to movement of the object in the optical axis direction cannot have a constant speed in a strict sense, as described above.

Therefore, when the focal length is small, or when the object distance is long, or when the brightness of the object is high, or when the detected moving speed is low, the moving speed is averaged. When the moving speed is averaged, a newer detection value may be weighted with a larger value according to the moving amount or detection time.

When the change amounts or rates of change in moving speeds $(\Delta x_R - \Delta x_L)/(t_1-t_0)$ and $(\Delta x_R'-\Delta x_L')/(t_3-t_1)$ of the object image are larger than a predetermined value, it is determined that the detection value is not reliable, and detection is disabled. At this time, the judgment value is increased according to the focal length, the object distance, or the brightness of the object from which it is predicted that movement of the object image is large with respect to movement of the object, as described above.

Even after camera-shake detection is performed, if the change amount or rate of change in moving speed of the object image is small, the image shift amount is predicted. This is because most of camera-shake states occur in a direction parallel to the camera, and movement in the optical axis direction is hard to occur.

In the above description, the number of transducers of the block to be correlated upon detection of movement of the object image is set to be the same as the number of transducers for obtaining an image shift amount. However, the number of transducers in the block may be changed.

More specifically, a small block including about 10 transducers, which block has a barycentric position in the block or a contrast peak position as the center, is obtained, and a new block position is set based on the previously detected object image and the block position and correlated with an object image detected next.

When it is determined that the correlation is low, and objects having a plurality of distances are included in a block, as described in detail in Published Unexamined Japanese Patent Application No. 63-165809 by the present applicant, the previously detected block is divided into small blocks each including about 10 transducers, and a correlation calculation with an object image detected next is performed, thereby obtaining the moving amounts of object images to be obtained. In this case, since a plurality of moving amounts are detected, a moving amount closest to the previously detected moving amount, a largest moving amount, a moving amount corresponding to a defocus amount indicating the closest distance, or a moving amount at the barycentric position or contrast peak position may be selected.

In this manner, when the number of transducers in a block is decreased, a background object and a moving main object can be separated from each other.

A method of calculating the time $t_2$ for predicting an image shift amount will be described below.

As described above, the image shift amount $\Delta Z''$ at the time $t_2$ is calculated according to equation (26) based on the image shift amount $\Delta Z$ at the time $t_1$ and the moving amounts $\Delta x_L$ and $\Delta x_R$ of the object image between the time $t_0$ and the time $t_1$. The defocus amount $\Delta D$ from the in-focus position on the optical axis is calculated according to equation (18), and the lens driving amount $\Delta L$ is calculated according to equation (19).

As the first embodiment, the time $t_2$ corresponding to an in-focus state upon completion of the lens driving operation will be calculated below.

$$t_2 = t_1 + t_a + (t_b + k_a \times \Delta L) \times k_b + t_c \tag{31}$$

where $t_a$ is a time period from the time $t_1$ until the lens driving operation is started, and includes the above-mentioned correlation calculation time period, the lens driving amount calculation time period, the input decision time period for LCD displays or switches of a camera, the photometric/electronic flash control time period, and the like. The $k_a$ is a coefficient for obtaining a driving time period proportional to the lens driving amount, and is stored in units of types of lenses, and focal lengths. Furthermore, $t_b$ is a coefficient for correcting a loss time period such as acceleration or deceleration in the lens driving operation regardless of the lens driving amount, and a fixed value is stored.

The $k_b$ is a coefficient, which is set according to the power supply voltage, the position of a camera, a change in lens weight due to attachment of a conversion lens, and the like. As the power supply voltage becomes lower, the motor torque is decreased, and hence, the driving time period is prolonged. When a lens is extended while the camera is directed upward, the driving time period is prolonged due to the weight of the lens itself. Contrary to this, when the lens is collapsed while the camera is directed upward, the driving time period is shortened due to the weight of the lens itself. The coefficient $k_b$ is used for correcting these influences, and is set according to the power supply voltage detected by a power supply voltage detection means, the position of the camera detected by a camera position detection means, an output from a coefficient calculation means according to the driving direction of the lens, an output from an attachment detection means for detecting whether or not a conversion lens is attached, and the like.

However, when the lens driving operation is performed at a constant speed, the coefficient $k_b$ is unnecessary. For example, the coefficient $k_b$ is unnecessary in a camera which drives a lens at full speed when an object image is not moved, or when no movement in the optical axis direction is detected, or when an object image is not predicted, and which drives a lens at a relatively low constant speed determined according to the power supply voltage, the camera position, and a change in lens weight due to attachment of a conversion lens when the lens is driven based on a predicted image shift amount upon detection of movement of an object image.

Note that $t_c$ is the processing time period after the lens driving operation is completed, and includes a motor brake time period, and an end processing time period of the photointerrupter.

When equations (26), (18), (19), and (31) are solved, the time $t_2$ corresponding to an in-focus state upon completion of the lens driving operation can be calculated. However, since equations become complicated, and a long calculation time period is required, the time $t_2$ is generally calculated as:

$$t_2 = t_1 + t_d + k_c \times \Delta Z'' \tag{32}$$

where $t_d$ is a constant obtained by adding an error component of equation (32) to $t_a + t_b \times k_b + t_c$ of equation (31). The $k_c$ is a conversion coefficient for obtaining a driving time period proportional to the lens driving amount, and is obtained by correcting values stored in units of types of lenses, and focal lengths according to the power supply voltage, the camera position, and a change in lens weight due to attachment of a conversion lens.

When equations (26) and (32) are solved, the predicted image shift amount $\Delta Z''$ at the time $t_2$ is given by:

$$\Delta Z'' = \frac{\Delta Z + t_d\{(\Delta x_L - \Delta x_R)/(t_1 - t_0)\}}{1 - k_c\{(\Delta x_L - \Delta x_R)/(t_1 - t_0)\}} \tag{33}$$

When the lens is driven based on a lens driving amount obtained using the above $\Delta Z''$ according to equations (18) and (19), a moving object can be focused upon completion of the lens driving operation.

As the second embodiment, the time $t_2$ until exposure is started will be calculated below.

The time $t_2$ in this case can be calculated as follows like in equation (32):

$$t_2 = t_1 + t_d + k_c \Delta Z'' + t_e \tag{35}$$

where $t_d$ and $k_c$ are the same as those in equation (32). The $t_e$ is the time period from the end of the lens driving operation until the shutter curtain is opened, and exposure is started, and includes the input decision time period of LCD displays or switches of the camera, the photometric time period, the electronic flash control time period, the mirror-up time period, and the like.

The predicted image shift amount $\Delta Z''$ at the time $t_2$ is given by:

$$\Delta Z'' = \frac{\Delta Z + \{(t_d + t_e) \times (\Delta x_L - \Delta x_R)\}/(t_1 - t_0)}{1 - (\Delta x_L - \Delta x_R)/(t_1 - t_0)} \tag{35}$$

Furthermore, as the third embodiment, the time $t_2$ until emission of an electronic flash device will be calculated below. Upon emission of the electronic flash device, an object image to be photographed corresponds to an image at an electronic flash emission time rather than that at an exposure start time at which the shutter curtain is opened. For this reason, in the electronic flash emission mode, an object image position at the electronic flash emission time is predicted to obtain a focused photograph.

From equation (34), the time $t_2$ in this case is given by:

$$t_2 = t_1 + t_d + k_c \Delta Z'' + t_e + t_f \tag{36}$$

where $t_d$, $k_c$, and $t_e$ are the same as those in equation (34). The $t_f$ is the time period from the beginning of exposure until electronic flash emission. The time period $t_f$ is set to be 1 to 2 msec in a so-called front curtain synchronous emission mode in which the electronic flash device emits light immediately after the shutter curtain is opened at the beginning of exposure. In a rear curtain synchronous emission mode in which the electronic flash device emits light immediately before the shutter curtain is closed immediately before the end of exposure, the time period $t_f$ has a value obtained by subtracting a predetermined period of time from an exposure time.

In a multi-emission mode in which light is repetitively emitted in a predetermined light amount at predetermined time intervals, the time period $t_f$ is set to be a time period from the beginning of exposure until the last emission (rear curtain synchronous multi-emission), thus obtaining photographs having different effects.

In the above embodiments, the object image position at the time $t_2$ is predicted based on object images at the times $t_0$ and $t_1$. As described above, when detection is continued to the time $t_3$, the detected moving speeds of the object image can be averaged. In this case, for example, equation (33) is rewritten as:

$$\Delta Z' = \frac{\Delta Z + t_f\{(\Delta x_L - \Delta x_R)/(t_1 - t_0) + (\Delta x_L' - \Delta x_R')/(t_3 - t_1)\} \times \frac{1}{2}}{1 - k_c\{(\Delta x_L - \Delta x_R)/(t_1 - t_0) + (\Delta x_L' - \Delta x_R')/(t_3 - t_1)\} \times \frac{1}{2}} \quad (37)$$

The detailed operation program according to the embodiment of the present invention will be described below with reference to the flow charts shown in FIGS. 12A, 12B and 13A, 13B.

Figure 12A:
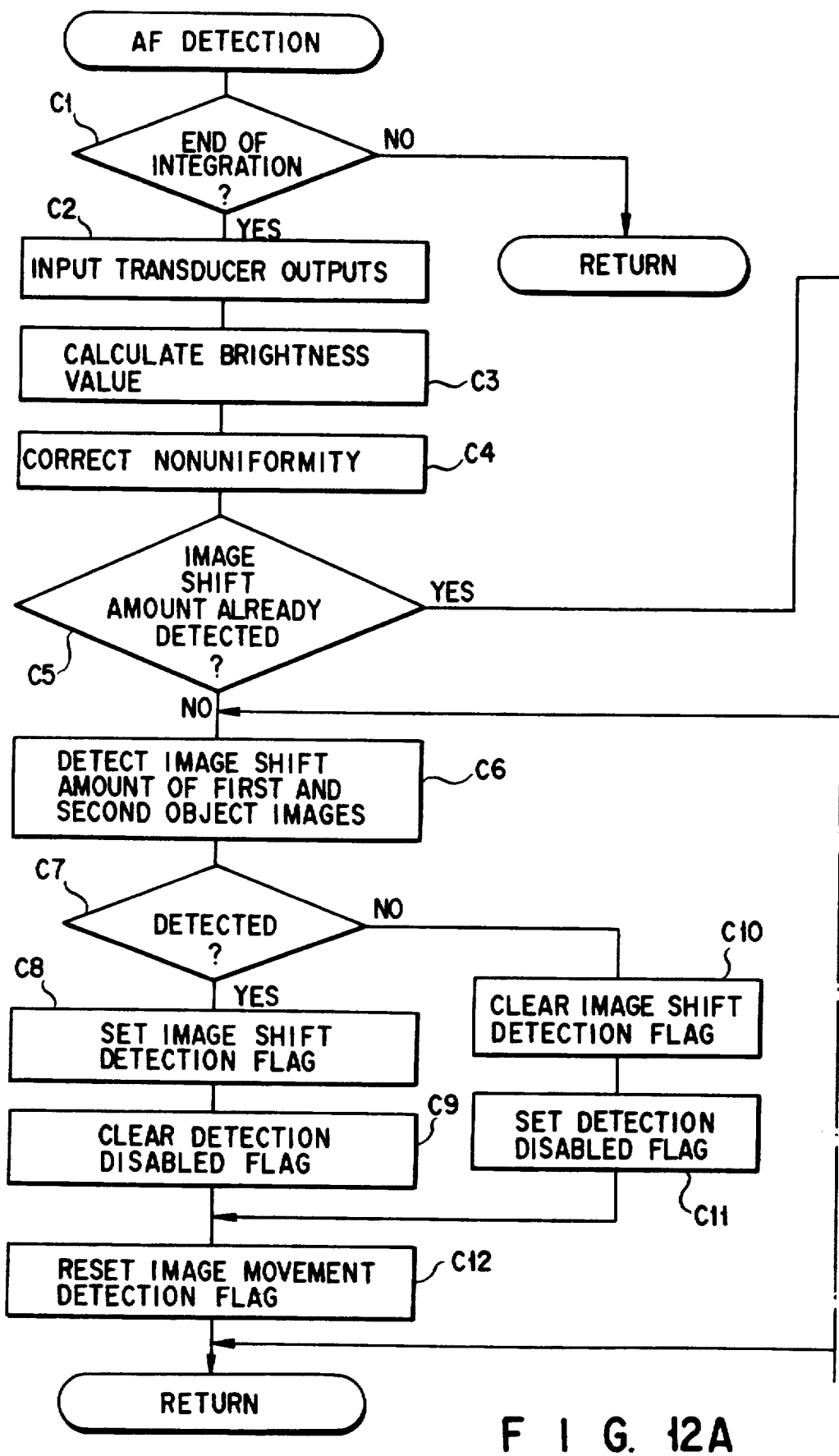
FIGS. 12A and 12B are flow charts for explaining an AF detection operation program.
Figure 12B:
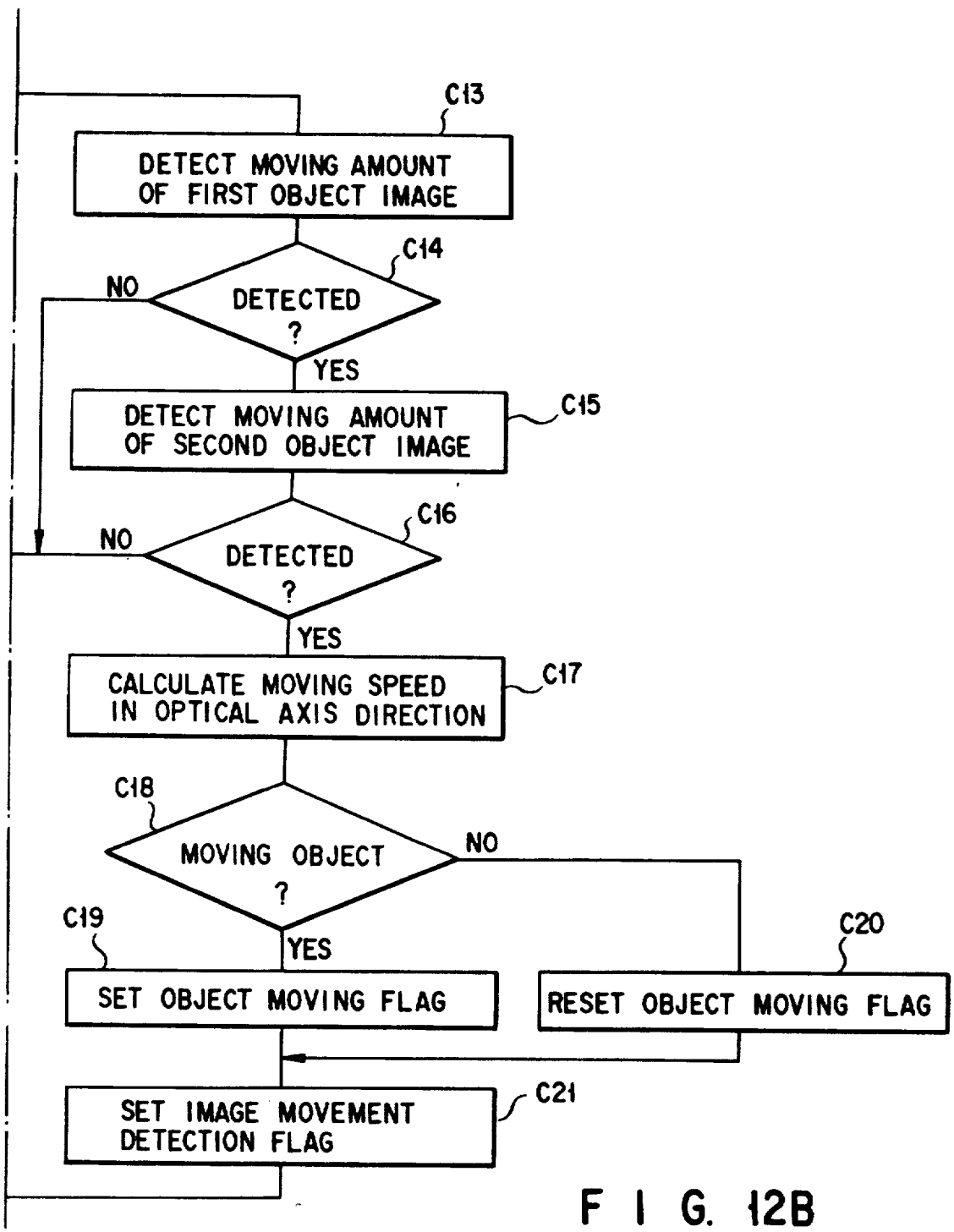

In the flow chart shown in FIGS. 12A and 12B, this AF detection operation program is repetitively executed while the power supply of the camera is kept ON. If it is determined in step C1 that the photoelectric conversion operation of the photoelectric transducers, i.e., a so called integration operation is not completed, the flow exits from the AF detection program, and enters the next camera operation program. On the other hand, if it is determined that the integration operation is completed, the flow advances to step C2, and the photoelectric transducer outputs corresponding to the number of transducers are input from the AFIC at a time.

In step C3, the brightness value of an object is calculated based on the transducer outputs and the integration time period. Thereafter, in step C4, a variation in sensitivity of the photoelectric transducers, and nonuniformity of illuminance of the AF optical system are corrected by correction values stored in the storage device. In step C5, it is checked if first and second object image shift amounts have already been detected. If NO in step C5, the flow advances to step C6, and the first and second object image shift amounts are calculated by the correlation calculation.

Furthermore, it is checked in step C7 if the image shift amounts can be detected. If YES in step C7, an image shift amount detection flag is set (step C8), and a detection disabled flag is cleared (step C9). On the other hand, if it is determined in step C7 that the image shift amounts cannot be detected, the image shift amount detection flag is cleared (step C10), and the detection disabled flag is set (step C11). Thereafter, an image movement detection flag is reset in step C12.

If it is determined in step C5 that the image shift amounts have already been detected, the moving amounts of the first and second images with respect to time are detected in units of the first and second object images. More specifically, in step C13, a correlation calculation is performed between the object image transducer outputs input and stored in the previous AF detection in correspondence with the first object image, and the present object image outputs, thereby detecting the moving amount. In step C14, it is checked if the moving amount of the first object image can be detected. If YES in step C14, the flow advances to step C15.

In step C15, the moving amount of the second object image with respect to time is detected. It is then checked in step C16 if the moving amount of the second object image can be detected. If YES in step C16, the flow advances to step C17.

On the other hand, if it is determined in step C14 or C16 that the moving amount of either the first or second object image cannot be detected, the flow returns to step C6, and the first and second object image shift amounts are calculated, thus restarting detection of the moving amount from the next AF detection.

When the moving amounts of both the first and second object images can be detected, the moving speed of the object image in the optical axis direction is detected in step C17. It is checked in step C18 if the detected moving speed is higher than a predetermined speed, and it can be regarded that the object is moving in the optical axis direction. If YES in step C18, the flow advances to step C19 to set an object moving flag; otherwise, the flag is reset in step C20.

Thereafter, the image movement detection flag is set in step C21.

Note that the predetermined speed used in judgment in step C18 is increased for a focal length and an object distance from which it is predicted that movement of the object image is large with respect to movement of the object. The judgment value may be changed according to the previous judgment result.

Figure 13A:
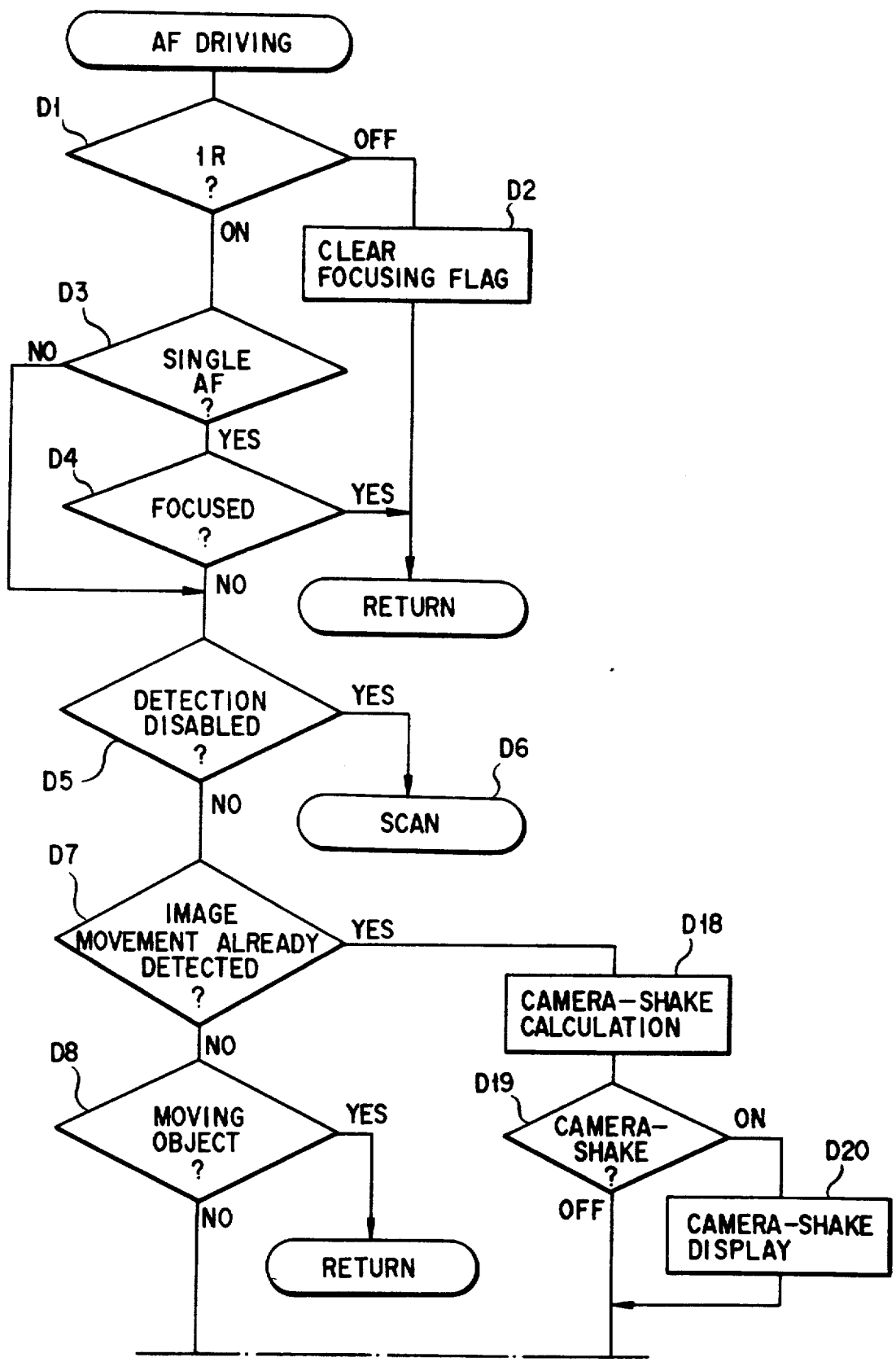
FIGS. 13A and 13B are flow charts for explaining an AF driving operation program.
Figure 13B:
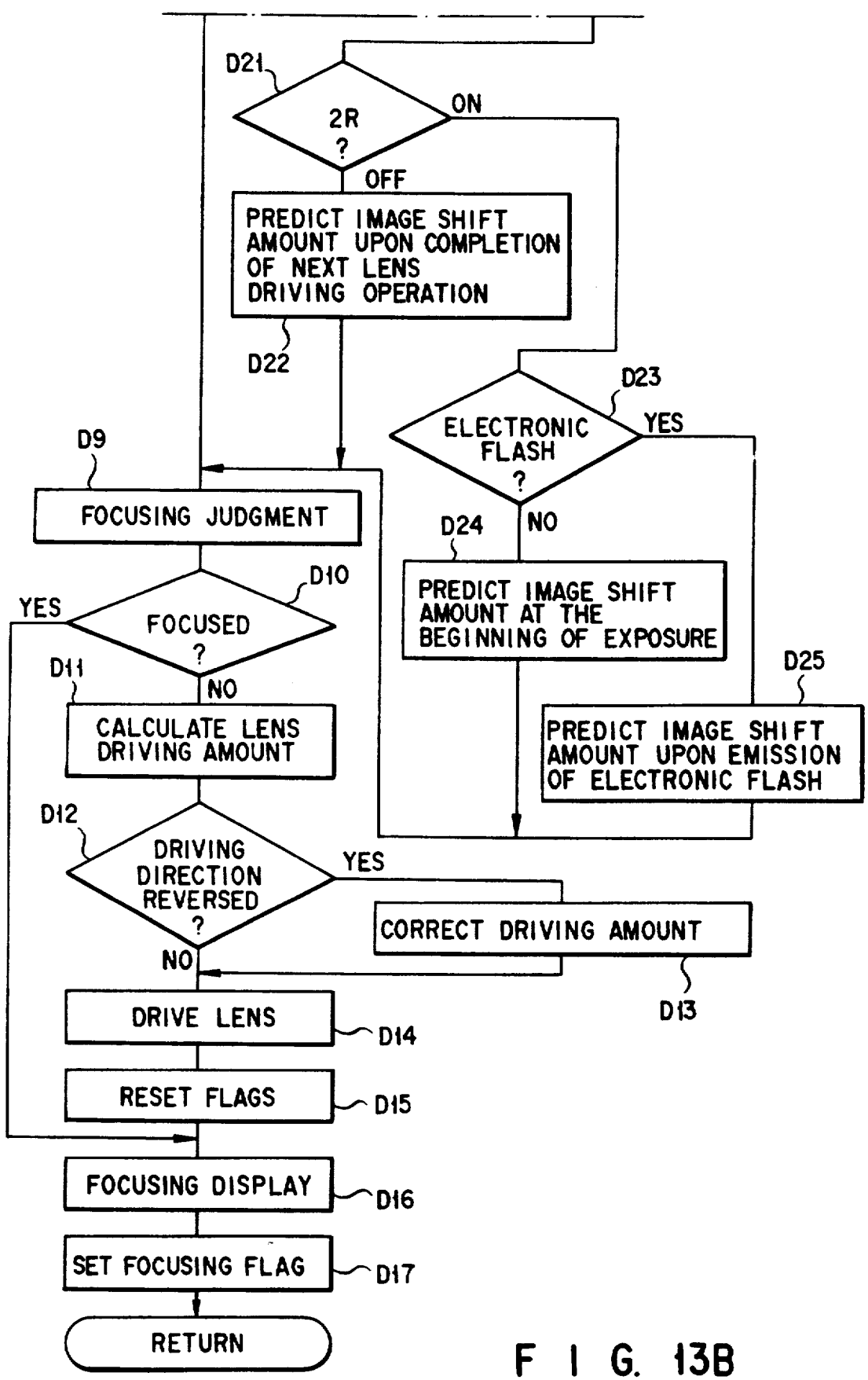

The AF driving program operation shown in FIGS. 13A and 13B are also repetitively performed while the power supply of the camera is kept ON like in the above-mentioned AF detection operation program. If it is determined in step D1 that a first-stroke signal (1R) of a release switch is not input, since no lens driving operation is performed, a focusing flag is cleared (step D2), and the flow is ended.

If it is determined in step D1 that the signal 1R is ON, it is checked in step D3 if an AF mode is a single AF mode or a continuous AF mode. If it is determined that the single AF mode is selected, once a focusing state is attained, the focusing state is locked, and no further lens driving operation is performed. For this reason, if it is determined in step D4 that the focusing state has already been attained, the AF driving operation is not performed. If it is determined in step D3 that the single AF mode is not selected, it is determined that the continuous AF mode is selected, and after a focusing state is attained, the AF driving operation is performed again according to a change in object.

If a focusing state is not attained in the single AF mode or if the continuous AF mode is selected, the flow advances to step D5 to check if the image shift amounts have already been detected. The detection disabled flag is a flag set in step C9 or C11 described above. This flag is set when the image shift amounts have already been detected, otherwise, it is reset.

If it is determined in step D5 that the image shift amounts cannot be detected, the flow advances to step D6, and a scan operation is performed. In the scan operation, a lens position allowing AF detection is searched while driving an AF lens at high speed. When the scan operation is performed, all the flags are reset, and the AF detection is restarted from the beginning.

On the other hand, if the image shift amounts have already been detected, the flow advances to step D7 to check if the moving amounts of the object images have already been detected. If YES in step D7, the flow advances to step D18 to perform a camera-shake calculation. Thereafter, whether or not camera-shake occurs is judged. If it is determined that camera-shake occurs, a camera-shake display is performed using an LCD or a tone generation member in step D20.

Then, an image shift amount is predicted. It is checked in step D21 if a second stroke signal (2R) of the release switch is enabled. The signal 2R is an exposure start operation signal. In the image shift amount prediction, as described above, when only the lens driving operation is performed without performing exposure, the image shift amount upon completion of the lens driving operation is predicted (step D22). It is checked if the electronic flash emission mode is set (step D23). Upon an exposure operation without electronic flash emission, an image shift amount at the beginning of exposure is predicted (step D24). Upon an exposure operation with electronic flash emission, an image shift amount is predicted using a time period until electronic flash emission.

If it is determined in step D7 that image movement is not detected, it is checked in step D8 if an object is moving. Since the image movement detection flag is reset in the lens driving operation, it is determined that the object is moving without detecting image movement when the lens driving operation is performed in the continuous AF mode. In this case, the lens driving operation is inhibited until image movement is detected again.

In step D9, whether or not the detected or predicted image shift amount falls within an allowable focusing range is judged. In step D10, the image shift amount is converted into a defocus amount on the optical axis, and it is judged if the defocus amount falls within the allowable focusing range. In this judgment, the allowable focusing range is determined by the depth of field, i.e., a photographing numerical aperture in a photographing operation. In the case of a low-contrast object, a low-brightness object, or a lens having a large focal length, since a variation in detected image shift amount is large, the allowable focusing range is widened to stabilize the AF operation.

Furthermore, the allowable focusing range may be changed according to the value of the above-mentioned correlation coefficient. This is because a higher correlation coefficient is obtained as an object has a higher contrast, which requires high focusing precision of a photograph. For example, when the correlation coefficient is 2 or less, the allowable focusing range is determined to be (FNO÷50) mm; otherwise, it is determined to be (FNO÷30) mm (FNO is the value of the photographing numerical aperture). When it is determined that an object image is moving (when an object moving flag is set), the allowable focusing range is widened in consideration of a prediction error.

If it is determined in step D10 that a focusing state is not attained, a lens driving amount is calculated based on the detected or predicted image shift amount in step D11. In step D12, when the driving direction of the lens is finally reversed with respect to the lens driving direction, the driving amount is corrected (step D13). When the driving direction is reversed due to a backlash of a gear train or fitting cluttering of a cam in a driving system of the photographing lens while the photographing lens is driven by the AF motor, even if the lens is driven by the detected driving amount, an idle driving amount corresponding to the backlash or fitting amount is generated, and the driving amount runs short.

As a correction method, a correction amount corresponding to the backlash o fitting amount may be stored in the storage device to correct the driving amount. However, the gear train and the cam may change over time according to a use condition, and it is difficult to define a correction amount. In this embodiment, the lens is driven while widening the allowable focusing range. Thus, even when the short driving amount varies, the image shift amount can fall within at least the allowable focusing range, and the AF operation can be stabilized. For example, when the allowable focusing range is q0.15 mm as the defocus amount on the optical axis, the lens is driven while widening the allowable focusing range by 0.15 mm to 0.2 mm assuming a short driving amount due to backlash or fitting cluttering when the lens driving direction is reversed.

In step D14, the AF lens is driven by the calculated lens driving amount. When it is predicted that the calculated lens driving amount exceeds an effective range of the lens, i.e., when it is predicted that the lens driving amount exceeds the closest distance position or the infinity distance position of the lens, after the lens is driven up to the closest distance position or the infinity distance position, it is determined that a focusing operation is impossible, and a focusing impossible display is made.

After the lens driving operation, flags are reset in step D15. The flags to be reset are the image shift amount detection flag, the detection disabled flag, and the image movement detection flag. This is to restart AF detection from the beginning since it is considered that an object image may largely change due to a change in lens.

For the same reason, when the zoom lens is driven and the focal length is changed, or when AF detection is not performed for a relatively long period of time, e.g., during a film photographing operation, these flags are reset to restart AF detection from the beginning.

After the flags are reset or if it is determined in step D10 that the focusing state is attained, the flow advances to step D16, a focusing display is made by an LCD and a tone generation member. According to this embodiment, when the focusing state is determined based on the image shift amount detected before the signal 1R, the focusing display is made without performing the lens driving operation. In this manner, in step D17, the focusing flag is set, and the AF driving program is ended. Based on this focusing flag, the camera CPU performs an exposure operation.

Note that the object image moving flag is not reset, as described above. This is to continuously detect movement of an object so as not to prevent focusing judgment in the first AF detection after the lens driving operation in the continuous AF mode.

Furthermore, in this embodiment, AF detection for confirmation is not performed after the lens driving operation. However, when the detected object image moving speed, the focal length, or the object distance may include a large prediction error according to the lens driving amount, AF detection for confirmation may be performed.

Another application will be described below.

Figure 11:
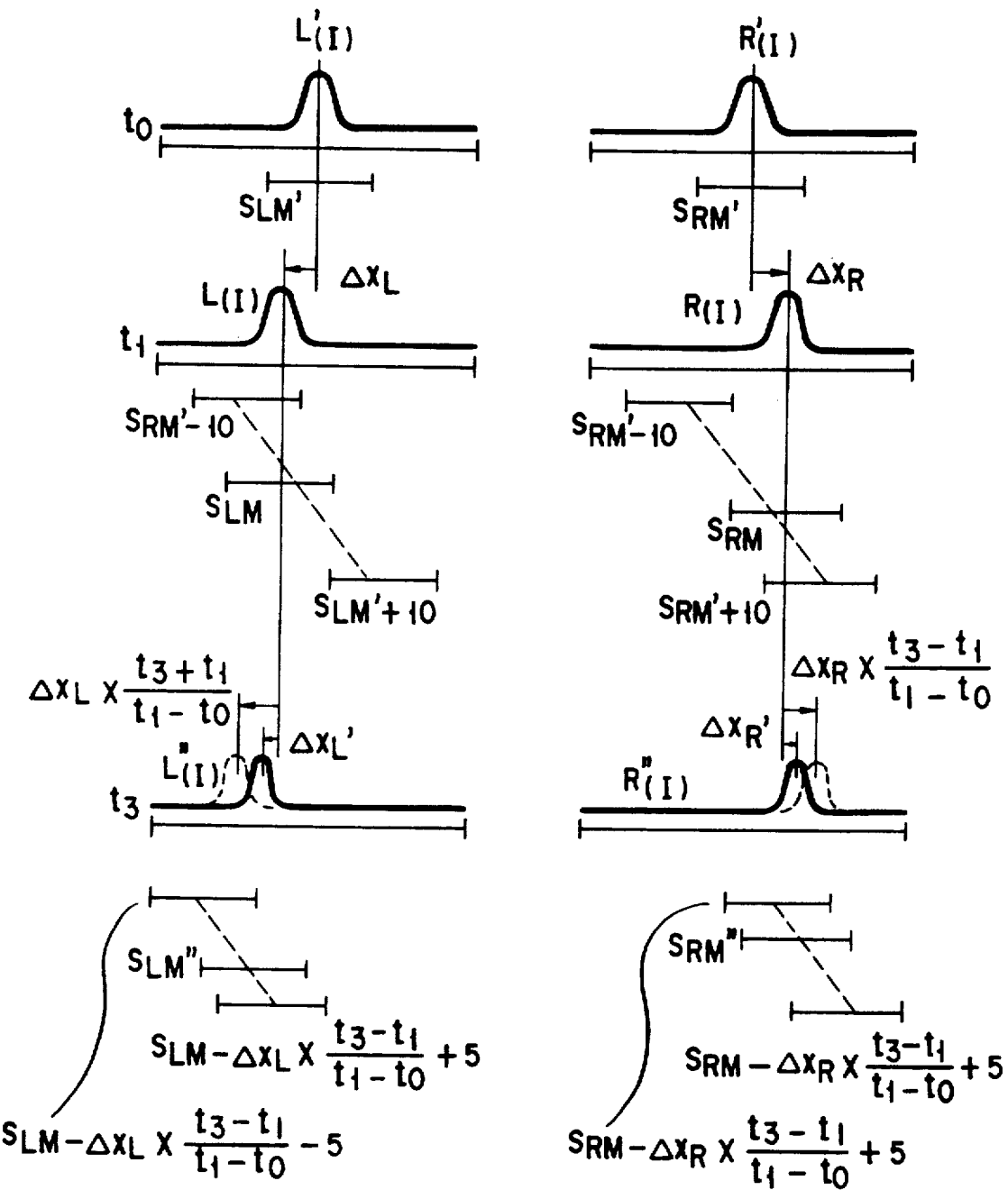
FIG. 11 is a view showing the relationship among correlation outputs at times $t_0$, $t_1$, and $t_3$.

At the time $t_3$ shown in FIG. 11, the predicted object image position is assumed to have values given by:

$$\Delta x_L \times \frac{t_3 - t_1}{t_1 - t_0}, \Delta x_R \times \frac{t_3 - t_1}{t_1 - t_0}$$

When a block after movement by these values exceeds the effective range of the photoelectric transducer array, AF detection is stopped for a predetermined period of time, and an image shift amount is predicted based on object image signals at the time $t_0$ and the time $t_1$, so that an object moving outside an AF field can be focused. Alternatively, the zoom lens may be driven to change the magnification, so that an object can always fall within the AF field.

The present invention may be applied to multi-point photometric operation, so that photometric element outputs corresponding to the predicted object image position are selected according to the moving amount of the object in a lateral direction with respect to the camera. Thus, a moving object can always be subjected to a photometric operation.

In the above embodiment, a correlation calculation is performed for object images at different times to detect movement of the object image. However, when the detection interval is short, and it is assumed that a change in object image is small, movement of the object image may be detected based on, e.g., a change in barycentric position given by:

$$\left( \sum_{I=1}^{64} L_{(I)} \right) \div 64$$

and a change in contrast central position given by:

$$\left( \sum_{I=1}^{63} |L_{(I)} - L_{(I+1)}| \right) \div 63$$

In this case, precision is not so high. However, since the calculation time period can be shortened, the above-mentioned detection may be performed, for example, only when the defocus amount is large.

Furthermore, as shown in FIGS. 3A and 3B, when an object is moving in a direction parallel to or perpendicular to a camera, the moving amounts $|\Delta x_L|$ and $|\Delta x_R|$ of the first and second object images are assumed to be equal to each other. In practice, however, a difference may often be present due to a variation in AF optical system (FIG. 7), and an inclination with respect to the optical axis. In this case, the moving amount of an object image is divided into components in the optical axis direction and a direction parallel to the optical axis, and differences generated in proportion to the moving amounts are corrected. The corrected data are stored in the storage device.

A detection method of an object image moving amount when the photoelectric conversion operation of the AFIC is interrupted will be described below.

A normal photoelectric transducer requires a long period of time for a photoelectric conversion operation in a low-brightness state. Therefore, when the photoelectric conversion operation is not ended after an elapse of a predetermined period of time since the photoelectric transducers are reset, the CPU supplies an integration stop signal to the AFIC to interrupt the photoelectric conversion operation. In this case, the photoelectric transducer outputs an object image signal waveform, as shown in FIG. 14A. FIG. 14B shows an object image signal waveform obtained when the photoelectric conversion operation is not interrupted. When the brightness of a light source changes over time, the waveform shown in FIG. 14A is obtained at a time $t_0$ and the waveform shown in FIG. 14B is obtained at a time $t_1$ In this case, movement of an object image is detected as follows.

A maximum output $D_{MAX}$ of an object image signal when the photoelectric conversion operation is interrupted (time $t_0$) is detected. In the case of the photoelectric transducers, the first and second object images have the same value $D_{MAX}$.

Outputs exceeding $D_{MAX}$ of object image signals obtained when the photoelectric conversion operation is not interrupted (time $t_1$) are fixed at $D_{MAX}$, thereby forming object image signals (FIG. 14C). A correlation calculation is performed using the signals shown in FIGS. 14A and 14B, thereby detecting the moving amounts of the object images. When the photoelectric conversion operation is interrupted at both the time $t_0$ and the time $t_1$, outputs can be fixed to a smaller one of the maximum output $D_{MAX0}$ at the time $t_0$ and a maximum output $D_{MAX1}$ at the time $t_1$.

FIG. 15 is a block diagram of another photoelectric conversion device. FIG. 15 shows a photoelectric conversion device known as a CCD sensor, and this device comprises two photoelectric transducer arrays 501 including 64 transducers, and a monitor element 502 for detecting the brightness of an object. A photocurrent generated in proportion to the light intensity in each photoelectric transducer is accumulated and integrated on an accumulation capacitor, and is sequentially read out by a CCD circuit. The readout integration output is amplified by an amplifier 503, converted into a digital signal by an A/D converter 504, and is then fetched by a CPU 505. The integration time period is determined by the output from the monitor element 502 or an integration stop signal 506 from an external circuit.

In this photoelectric conversion device, when transducer outputs are properly integrated based on the monitor element output at a time $t_0$, and an integration is interrupted for the above-mentioned reason at a time $t_1$, waveforms shown in FIGS. 16A and 16B are obtained, respectively. In this case, the waveform at the time $t_1$ is corrected by the ratio of integration time periods of the waveforms at the time $t_0$ and the time $t_1$, or the ratio of maximum output values, or the ratio of the total sums of outputs, thereby forming a waveform shown in FIG. 16C.

A correlation calculation is performed using the waveforms shown in FIGS. 16A and 16B, thereby detecting the moving amount of an object. When an integration is interrupted by an external circuit at both the time $t_0$ and the time $t_1$, or when the gain of the amplifier is changed between the time $t_0$ and the time $t_1$, the waveforms at the time $t_0$ and the time $t_1$ are processed to have substantially the same amplitudes, thereby detecting movement of an object image.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A focus detection apparatus comprising:
    a focus detection optical system for splitting light from an object into two light beams;
    two photoelectric transducer groups for converting the light beams guided by said focus detection optical system into first and second object image signals;
    shift amount calculation means for calculating a focus shift amount on the basis of the first and second object image signals;
    storage means for storing the first and second image signals and the focus shift amount at a first timing;
    first prediction calculation means for predictively calculating the first object image signal at a third timing on the basis of the first object image signal at a second timing, and the first object image signal at the first timing stored in said storage means;
    second prediction calculation means for predictively calculating the second object image signal at the third timing on the basis of the second object image signal at the second timing, and the second object image signal at the first timing stored in said storage means; and
    shift amount prediction calculation means for predictively calculating a focus shift amount at the third timing on the basis of the focus shift amount at the first timing stored in said storage means, the first object image signal at the third timing calculated by said first prediction calculation means, and the second object image signal at the third timing calculated by said second prediction calculation means.

2. An apparatus according to claim 1, wherein said first and second prediction calculation means respectively calculate positions of object images on the photoelectric transducer groups at the third timing on the basis of positions of object images on the photoelectric transducer groups at the first timing, and positions of object images on the photoelectric transducer groups at the second timing.

3. An automatic focusing apparatus for a camera, comprising:
    a focus detection optical system for splitting light from an object into two light beams;
    two photoelectric transducer groups for converting the light beams guided by said focus detection optical system into first and second object image signals;
    shift amount calculation means for calculating a focus shift amount on the basis of the first and second object image signals;
    storage means for storing the first and second image signals and the focus shift amount at a first timing;
    first prediction calculation means for predictively calculating the first object image signal after an elapse of a predetermined period of time on the basis of the first object image signal at a second timing, and the first object image signal at the first timing stored in said storage means;
    second prediction calculation means for predictively calculating the second object image signal after the elapse of the predetermined period of time on the basis of the second object image signal at the second timing, and the second object image signal at the first timing stored in said storage means;
    shift amount prediction calculation means for predictively calculating a focus shift amount after the elapse of the predetermined period of time on the basis of the focus shift amount at the first timing stored in said storage means, the first object image signal after the elapse of the predetermined period of time calculated by said first prediction calculation means, and the second object image signal after the elapse of the predetermined period of time calculated by said second prediction calculation means; and
    lens driving means for driving a photographing lens on the basis of an output from said shift amount prediction calculation means.

4. An apparatus according to claim 3, wherein said first and second prediction calculation means respectively calculate positions of object images on the photoelectric transducer groups after the elapse of the predetermined period of time on the basis of positions of object images on the photoelectric transducer groups at the first timing, and positions of object images on the photoelectric transducer groups at the second timing.

5. An apparatus according to claim 3, wherein the predetermined period of time is a time period required for driving said photographing lens.

6. An apparatus according to claim 3, wherein the predetermined period of time is a time period from when an exposure start signal is input until an exposure operation is actually started.

7. An apparatus according to claim 3, wherein the predetermined period of time is a time period from when an exposure start signal is input until an electronic flash device for a photographing operation emits light.

8. An apparatus according to claim 7, wherein the predetermined period of time is a time period from when the exposure start signal is input until first light emission is performed when said electronic flash device emits light a plurality of number of times for a photographing operation of one frame.

9. An apparatus according to claim 7, wherein the predetermined period of time is a time period from when the exposure start signal is input until last light emission is performed when said electronic flash device emits light a plurality of number of times for a photographing operation of one frame.

10. A focus detection apparatus comprising:
    a focus detection optical system for splitting light from an object into two light beams;
    two photoelectric transducer groups for converting the light beams guided by said focus detection optical system into first and second object image signals;
    first calculation means for performing a correlation calculation of the first and second object image signals to calculate a focus shift amount;
    storage means for storing the first and second object image signals and the focus shift amount at a first timing;

second calculation means for performing a correlation calculation of the first object image signal at a second timing, and the first object image signal at the first timing stored in said storage means so as to calculate a moving amount or a moving speed of the first object image signal, which is moving along said photoelectric transducer group upon movement of the object;

third calculation means for performing a correlation calculation of the second object image signal at the second timing, and the second object image signal at the first timing stored in said storage means so as to calculate a moving amount or a moving speed of the second object image signal, which is moving along said photoelectric transducer group upon movement of the object; and shift amount prediction calculation means for predictively calculating a focus shift amount at a predetermined timing on the basis of the focus shift amount stored in said storage means, and the outputs from said second and third calculation means, wherein each of said first, second, and third calculation means comprises judgment means for judging a presence/absence of a correlation in the correlation calculation, and judgment levels of the presence/absence of the correlation of said second and third calculation means are smaller than a judgment level of said first calculation means.

11. A focus detection apparatus comprising:

a focus detection optical system for splitting light from an object into two light beams;

two photoelectric transducer groups for converting the light beams guided by said focus detection optical system into first and second object image signals;

first calculation means for performing a correlation calculation of the first and second object image signals to calculate a focus shift amount;

storage means for storing the first and second object image signals and the focus shift amount at a first timing;

second calculation means for performing a correlation calculation of the first object image signal at a second timing, and the first object image signal at the first timing stored in said storage means so as to calculate a moving amount or a moving speed of the first object image signal, which is moving along said photoelectric transducer group upon movement of the object;

third calculation means for performing a correlation calculation of the second object image signal at the second timing, and the second object image signal at the first timing stored in said storage means so as to calculate a moving amount or a moving speed of the second object image signal, which is moving along said photoelectric transducer group upon movement of the object; and shift amount prediction calculation means for predictively calculating a focus shift amount at a predetermined timing on the basis of the focus shift amount stored in said storage means, and the outputs from said second and third calculation means, wherein correlation ranges of the correlation calculations in said second and third calculation means are narrower than a correlation range of the correlation calculation in said first calculation means.

12. A focus detection apparatus comprising:

a focus detection optical system for splitting light from an object into two light beams;

two photoelectric transducer groups for converting the light beams guided by said focus detection optical system into first and second object image signals;

first calculation means for performing a correlation calculation of the first and second object image signals to calculate a focus shift amount;

storage means for storing the first and second object image signals and the focus shift amount at a first timing;

second calculation means for performing a correlation calculation of the first object image signal at a second timing, and the first object image signal at the first timing stored in said storage means so as to calculate a moving amount or a moving speed of the first object image signal, which is moving along said photoelectric transducer group upon movement of the object;

third calculation means for performing a correlation calculation of the second object image signal at the second timing, and the second object image signal at the first timing stored in said storage means so as to calculate a moving amount or a moving speed of the second object image signal, which is moving along said photoelectric transducer group upon movement of the object; and shift amount prediction calculation means for predictively calculating a focus shift amount at a predetermined timing on the basis of the focus shift amount stored in said storage means, and the outputs from said second and third calculation means, wherein output regions of said photoelectric transducer groups for the correlation calculations in said second and third calculation means are smaller than an output region of said photoelectric transducer groups for the correlation calculations in said first calculation means.

13. A focus detection method for splitting light from an object into two light beams, guiding the light beams to first and second photoelectric transducer groups, and detecting a focal point on the basis of a phase difference between first and second object image signals from said first and second photoelectric transducer groups, comprising the steps of:

a) repetitively storing the first and second object image signals from said first and second photoelectric transducer groups;

b) repetitively calculating a moving amount of the first object image signal, which is moving along the photoelectric transducer group upon movement of an object, on the basis of the current first object image signal output from said first photoelectric transducer group, and the previous first object image signal stored in said storage means;

c) repetitively calculating a moving amount of the second object image signal, which is moving along the photoelectric transducer group upon movement of an object, on the basis of the current second object image signal output from said second photoelectric transducer group, and the previous second object image signal stored in said storage means;

d) updating storage values of the first and second object image signals;

e) predicting a position of the first object image signal on said first photoelectric transducer group after an elapse of a predetermined period of time on the basis of the moving amount calculated in the step b);

f) predicting a position of the second object image signal on said second photoelectric transducer group after the elapse of the predetermined period of time on the basis of the moving amount calculated in the step c);

g) predicting a focus shift amount after the elapse of the predetermined period of time on the basis of the predicted positions calculated in the steps e) and f); and h) repeating from the step b) to step g).

14. A method according to claim 13, wherein when the moving amount of the object image signal is larger than a predetermined value in the step b) or c), the following steps e), f), and g) are not executed.

15. A method according to claim 13, wherein each of the steps b) and c) includes the step of performing a correlation calculation of the current object image signal output from the photoelectric transducer group, and the previous object image signal stored in said storage means to calculate the moving amount, a correlation range of the correlation calculation being determined on the basis of the moving amount calculated in the step b) or c) in previous processing.

16. An automatic focusing apparatus having image split means for splitting an object image into two images, and first and second photoelectric transducer arrays for respectively receiving the split images, comprising:

moving amount calculation means for calculating a moving amount of a first object image on the basis of a position of the first object image on said first photoelectric transducer array at a first timing, and a position of the first object image after an elapse of a first predetermined period of time from the first timing, and for calculating a moving amount of a second object image on the basis of a position of the second object image on said second photoelectric transducer array at the first timing, and a position of the second object image after the elapse of the first predetermined period of time from the first timing;

prediction calculation means for predicting the positions of the first and second object images after an elapse of a second predetermined period of time following the first predetermined period of time, on the basis of outputs from said moving amount calculation means; and means for calculating a necessary lens driving amount on the basis of the predicted positions of the first and second object images predicted by said prediction calculation means.

17. A camera-shake displaying apparatus for a camera, which has image split means for splitting an object image into two images, and first and second photoelectric transducer arrays for respectively receiving the split images, comprising:

first moving amount calculation means for calculating a moving amount of a first object image on the basis of a position of the first object image on said first photoelectric transducer array at a first timing, and a position of the first object image after an elapse of a first predetermined period of time from the first timing, and for calculating a moving amount of a second object image on the basis of a position of the second object image on said second photoelectric transducer array at the first timing, and a position of the second object image after the elapse of the first predetermined period of time from the first timing;

second moving amount calculation means for calculating moving amounts of the first and second object images until an elapse of a second predetermined period of time following the first predetermined period of time; and means for displaying on the basis of the first predetermined period of time, outputs from said first moving amount calculation means, the second predetermined period of time, and outputs from said second moving amount calculation means whether or not a camera-shake state occurs.

18. A focus detection apparatus for a camera, which has image split means for splitting an object image into two images, and first and second photoelectric transducer arrays for respectively receiving the split images, comprising:

first calculation means for calculating an image shift amount at a first timing on the basis of a position of a first object image on said first photoelectric transducer array, and a position of a second object image on said second photoelectric transducer array at the first timing;

second calculation means for calculating a moving amount of the first object image on the basis of the position of the first object image at the first timing, and the position of the first object image after an elapse of a predetermined period of time from the first timing, and for calculating a moving amount of the second object image on the basis of the position of the second object image at the first timing, and the position of the second object image after the elapse of the predetermined period of time from the first timing; and third calculation means for calculating an object distance after the elapse of the predetermined period of time on the basis of the image shift amount and the moving amounts of the first and second object images at the first timing.

19. An automatic focusing apparatus for a camera, which has image split means for splitting an object image into first and second images, and first and second photoelectric transducer arrays for respectively receiving the split images, comprising:

means for calculating an image shift amount of an object on the basis of the first and second images in an early stage of a focus detection operation;

first calculation means for calculating a change in position over time of the first image on said first photoelectric transducer array;

second calculation means for calculating a change in position over time of the second image on said second photoelectric transducer array;

first prediction means for predicting a change in position over time of the first image on the basis of an output from said first calculation means;

second prediction means for predicting a change in position over time of the second image on the basis of an output from said second calculation means; and means for calculating a position of the object image on the basis of the image shift amount, and the outputs from said first and second prediction means.

20. A distance detection apparatus for a camera, which has image split means for splitting an object image into first and second images, and first and second photoelectric transducer arrays for respectively receiving the split images, comprising:

means for calculating an image shift amount of an object on the basis of the first and second images in an early stage of a focus detection operation;

first calculation means for calculating a change in position over time of the first image on said first photoelectric transducer array;

second calculation means for calculating a change in position over time of the second image on said second photoelectric transducer array; and means for calculating a position of the object image on the basis of the image shift amount, and outputs from said first and second calculation means.

* * * * *